United States Patent
Kim et al.

(10) Patent No.: US 9,690,621 B2
(45) Date of Patent: Jun. 27, 2017

(54) MULTITASKING METHOD AND ELECTRONIC DEVICE THEREFOR

(71) Applicant: Samsung Electronics Co., Ltd., Gyeonggi-do (KR)

(72) Inventors: Byung-Soo Kim, Gyeonggi-do (KR); Kyung-Min Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 53 days.

(21) Appl. No.: 14/562,226

(22) Filed: Dec. 5, 2014

(65) Prior Publication Data

US 2015/0160976 A1    Jun. 11, 2015

(30) Foreign Application Priority Data

Dec. 6, 2013    (KR) .................. 10-2013-0151183

(51) Int. Cl.
*G06F 9/46*    (2006.01)
*G06F 9/48*    (2006.01)

(52) U.S. Cl.
CPC .......... *G06F 9/4881* (2013.01); *G06F 9/485* (2013.01); *G06F 2209/482* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 5,075,675 A | * | 12/1991 | Barker | G06F 3/0481 715/794 |
| 5,542,088 A | * | 7/1996 | Jennings, Jr. | G06F 9/4881 718/103 |
| 6,567,839 B1 | * | 5/2003 | Borkenhagen | G06F 9/3009 712/205 |
| 7,162,276 B2 | * | 1/2007 | Iwase | H04M 1/605 455/569.1 |
| 8,483,765 B2 | * | 7/2013 | Cho | G06F 9/4843 455/158.4 |

(Continued)

FOREIGN PATENT DOCUMENTS

| | | | | |
|---|---|---|---|---|
| JP | 2013-135242 | | 7/2013 | |
| KR | 10-2006-0056070 | | 5/2006 | |
| SE | WO 2005003970 A1 | * | 1/2005 | .......... G06F 1/3203 |

*Primary Examiner* — Tuan Q. Dam
*Assistant Examiner* — Zheng Wei

(57) ABSTRACT

A multitasking method of changing a state of an application changed to a background program of a lower priority to a freeze state which is a sleep mode or execute the application continuously in an unfreeze state which is an operation mode according to identification information, an activation state, etc. of the corresponding application to perform a multitasking operation and an electronic device therefor are provided. The method includes changing a first application program to a background program of a lower priority and executing a second application program as a foreground program of a higher priority and determining whether to change a state of the first application program changed to the background program to a freeze state which is a sleep mode or execute the first application program continuously in an unfreeze state which is an operation mode according to identification information of the first application program.

20 Claims, 19 Drawing Sheets

(56) References Cited

U.S. PATENT DOCUMENTS

| | | | |
|---|---|---|---|
| 9,007,239 B1* | 4/2015 | Lissack | G06F 9/4418 341/50 |
| 9,032,413 B2* | 5/2015 | Schwartz, Jr. | G06F 9/44521 718/104 |
| 9,183,047 B2* | 11/2015 | Lim | G06F 9/4881 |
| 9,201,693 B2* | 12/2015 | Fuller | G06F 9/5011 |
| 2003/0083106 A1* | 5/2003 | Seo | H04M 1/72522 455/566 |
| 2003/0119562 A1* | 6/2003 | Kokubo | H04M 1/72522 455/566 |
| 2003/0203746 A1* | 10/2003 | Iwase | H04M 1/605 455/569.1 |
| 2004/0210345 A1* | 10/2004 | Noda | G05D 1/0088 700/245 |
| 2005/0034124 A1* | 2/2005 | House | G06F 9/4825 718/100 |
| 2005/0164688 A1* | 7/2005 | Satake | H04M 1/6041 455/418 |
| 2007/0038763 A1* | 2/2007 | Oestvall | G06F 1/3203 709/229 |
| 2008/0022279 A1* | 1/2008 | Jung | G06F 9/4443 718/100 |
| 2008/0066006 A1* | 3/2008 | Kim | G06F 3/0481 715/781 |
| 2008/0072146 A1* | 3/2008 | Sung | G06F 17/30905 715/273 |
| 2008/0256477 A1* | 10/2008 | Cho | G06F 3/04812 715/772 |
| 2009/0036108 A1* | 2/2009 | Cho | G06F 9/4843 455/418 |
| 2010/0066698 A1* | 3/2010 | Seo | G06F 3/04883 345/173 |
| 2010/0115525 A1* | 5/2010 | Loucks | G06F 9/4881 718/103 |
| 2010/0182265 A1* | 7/2010 | Kim | G06F 1/1616 345/173 |
| 2010/0218189 A1* | 8/2010 | Baek | G06F 9/445 718/100 |
| 2010/0299597 A1* | 11/2010 | Shin | G06F 3/0482 715/702 |
| 2011/0080356 A1* | 4/2011 | Kang | G06F 3/0486 345/173 |
| 2011/0134110 A1* | 6/2011 | Song | G06F 3/04815 345/419 |
| 2011/0202872 A1* | 8/2011 | Park | G06F 3/0481 715/790 |
| 2011/0219334 A1* | 9/2011 | Park | H04M 1/72583 715/808 |
| 2011/0296416 A1* | 12/2011 | Kim | G06F 11/328 718/100 |
| 2012/0054752 A1* | 3/2012 | Chin | G06F 1/3278 718/100 |
| 2012/0258722 A1* | 10/2012 | Liu | G06F 9/5022 455/450 |
| 2012/0274613 A1* | 11/2012 | Ishizuka | G06F 3/1423 345/204 |
| 2012/0278886 A1* | 11/2012 | Luna | G06F 21/552 726/22 |
| 2012/0311596 A1* | 12/2012 | Imai | G06Q 30/0255 718/103 |
| 2012/0311608 A1* | 12/2012 | Park | G06F 3/0486 718/107 |
| 2012/0317498 A1* | 12/2012 | Logan | G06F 3/04817 715/752 |
| 2013/0024812 A1* | 1/2013 | Reeves | G06F 3/1423 715/810 |
| 2013/0031600 A1* | 1/2013 | Luna | G06F 21/554 726/1 |
| 2013/0174179 A1* | 7/2013 | Park | G06F 9/4843 718/107 |
| 2013/0205366 A1* | 8/2013 | Luna | H04L 63/101 726/1 |
| 2013/0215127 A1* | 8/2013 | Palakshamurthy | G06T 1/20 345/522 |
| 2013/0262716 A1* | 10/2013 | Noro | G06F 13/364 710/36 |
| 2013/0311985 A1* | 11/2013 | Aleksandrov | G06F 8/65 717/173 |
| 2013/0335373 A1* | 12/2013 | Tomiyasu | G06F 3/016 345/174 |
| 2013/0336308 A1* | 12/2013 | Laasik | H04M 7/0057 370/352 |
| 2013/0347002 A1* | 12/2013 | Basu | G06F 9/485 718/107 |
| 2014/0013271 A1* | 1/2014 | Moore | G06F 3/0482 715/792 |
| 2014/0013331 A1* | 1/2014 | Noro | G06F 9/50 718/103 |
| 2014/0068624 A1* | 3/2014 | Fuller | G06F 9/5011 718/104 |
| 2014/0115125 A1* | 4/2014 | Chen | H04L 67/26 709/219 |
| 2014/0123151 A1* | 5/2014 | Kishan | G06F 9/4881 718/103 |
| 2014/0132081 A1* | 5/2014 | Lin | H03K 17/94 307/116 |
| 2014/0177497 A1* | 6/2014 | Backholm | H04W 52/0251 370/311 |
| 2014/0235228 A1* | 8/2014 | Hirako | H04M 1/72522 455/418 |
| 2014/0280580 A1* | 9/2014 | Langlois | H04W 4/005 709/204 |
| 2014/0317634 A1* | 10/2014 | Ishikawa | G06F 9/5038 718/103 |
| 2014/0354527 A1* | 12/2014 | Chen | G06F 3/017 345/156 |
| 2015/0062175 A1* | 3/2015 | Kim | G09G 3/3648 345/639 |
| 2015/0105020 A1* | 4/2015 | Aida | H04M 1/72519 455/41.2 |
| 2015/0121229 A1* | 4/2015 | Wang | G06F 3/0484 715/728 |
| 2015/0135183 A1* | 5/2015 | Kipp | G06F 9/46 718/103 |
| 2015/0143340 A1* | 5/2015 | Shin | G06F 11/3013 717/124 |

* cited by examiner

Home Menu
Application List
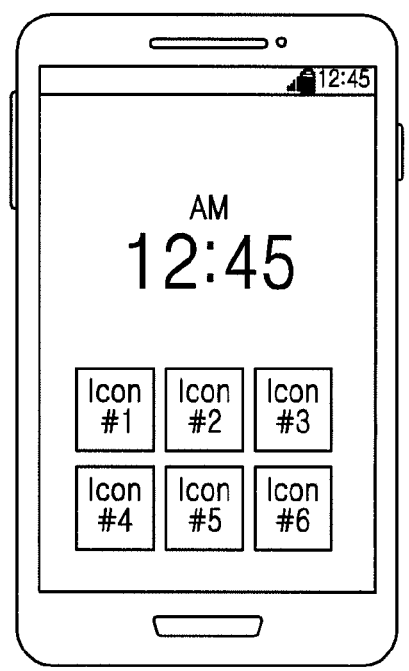
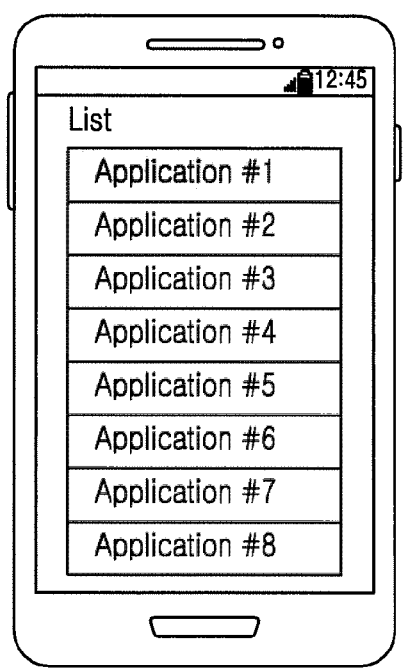
FIG.1

Realtime Process Management Table

| Table Index | PID | Aplication Name | PID List | exclude | Current Position | Current State |
|---|---|---|---|---|---|---|
| 1 | 101 | ClusterHome | - | 1 | - | Unfreeze |
| 2 | 111 | Browser | 112,113 | 0 | Background | Freeze |
| 3 | 121 | Gallery | - | 0 | Foreground | Unfreeze |
| ..... | ..... | ..... | ..... | ..... | ..... | ..... |
| 8 | 201 | MusicPlayer | - | 0 | Background | Unfreeze (activity) |
| 0 | 211 | NotificationPanel | - | 1 | - | Unfreeze |
| ..... | ..... | ..... | ..... | ..... | ..... | ..... |

FIG.8

White List

| White List Number | Application Type | Application Name |
|---|---|---|
| 0001 | Home | ClusterHome |
| 0002 | Menu | MenuScreen |
| 0003 | Popup | SystemPopup |
| 0004 | Panel | NotificationPanel |
| ⋮ | ⋮ | ⋮ |

FIG.9

Single Tasking

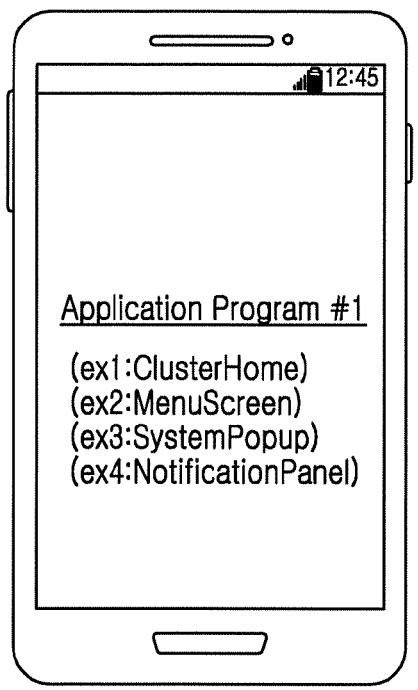

Application Program #1

(ex1:ClusterHome)
(ex2:MenuScreen)
(ex3:SystemPopup)
(ex4:NotificationPanel)

Foreground =
Application Program #1

Multi Tasking

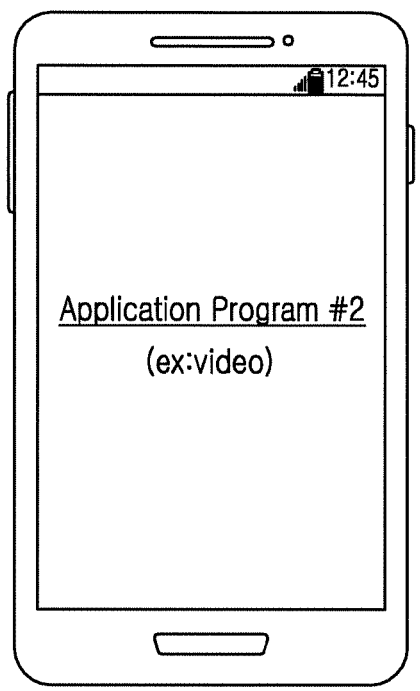

Application Program #2
(ex:video)

Foreground = Application Program #2
Background = Application Program #1

White List ⇨
(ex1:ClusterHome_Unfreeze)
(ex2:MenuScreen_Unfreeze)
(ex3:SystemPopup_Unfreeze)
(ex4:NotificationPanel_Unfreeze)

FIG.12

MULTITASKING METHOD AND ELECTRONIC DEVICE THEREFOR

PRIORITY

The present application is related to and claims the benefit under 35 U.S.C. §119(a) of a Korean patent application filed in the Korean Intellectual Property Office on Dec. 6, 2013 and assigned Ser. No. 10-2013-0151183, the entire disclosure of which is hereby incorporated by reference.

TECHNICAL FIELD

The present disclosure relates to a multitasking method of changing a state of an application changed to a background program of a lower priority to a freeze state which is a sleep mode or execute the application continuously in an unfreeze state which is an operation mode according to identification information, an activation state, and the like of the corresponding application to perform a multitasking operation and an electronic device therefor.

BACKGROUND

Each of electronic devices of various types, such as smart phones or tablet Personal Computers (PCs), may perform a multitasking operation for simultaneously processing a plurality of different application programs (hereinafter, referred to as applications). In order to perform the multitasking operation, one electronic device has an Operating System (OS) for simultaneously performing a plurality of tasks.

When a plurality of applications are simultaneously executed, because power is much consumed, for example, a method of efficiently reducing an amount of power consumed while the multitasking operation is performed becomes an important issue in each of the electronic devices such as smart phones or tablet PCs, when each of them use battery power.

SUMMARY

To address the above-discussed deficiencies, it is a primary object to provide a multitasking method of changing a state of an application changed to a background program of a lower priority to a freeze state which is a sleep mode or continuously executing the application in an unfreeze state which is an operation mode according to identification information, an activation state, and the like of the corresponding application and an electronic device therefor.

In a first example, a multitasking method is provided. The method includes changing an application previously changed to a background program to a foreground program. The method also includes automatically updating data to operate normally and executing the application, or efficiently terminating the application in a background program state without changing the application to a foreground program, according to a resume request, a back request, an event request, and a terminate request.

In second example, a multitasking method of an electronic device is provided. The multitasking method includes changing a first application program to a background program of a lower priority. The multitasking method also includes executing a second application program as a foreground program of a higher priority. The multitasking method further includes determining whether to change a state of the first application program changed to the background program to a freeze state which is a sleep mode or determining whether to execute the first application program continuously in an unfreeze state which is an operation mode according to identification information of the first application program.

In third example, an electronic device is provided. The electronic device includes a processor configured to change a first application program to a background program of a lower priority. The processor is also configured to execute a second application program as a foreground program of a higher priority. The electronic device also includes a display module configured to display images of the foreground program, wherein the processor is configured to determine whether to change a state of the first application program changed to the background program to a freeze state which is a sleep mode or to execute the first application program continuously in an unfreeze state which is an operation mode according to identification information of the first application program.

In a fourth example, a computer readable medium of an electronic device is provided. The computer readable medium is configured to store one or more programs including instructions for allowing an electronic device to change a first application program to a background program of a lower priority. The computer readable medium is also configured to execute a second application program as a foreground program of a higher priority. The computer readable medium is further configured to determine whether to change a state of the first application program changed to the background program to a freeze state which is a sleep mode or to execute the first application program continuously in an unfreeze state which is an operation mode according to identification information of the first application program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 is a screen illustrating an example process of displaying an application list in a conventional electronic device according to this disclosure;

FIG. 8 illustrates an example real-time process management table according to this disclosure;

FIG. 9 is a table illustrating an example white list according to this disclosure;

FIG. 12 is a screen illustrating an example process of changing applications of a white list to background programs according to this disclosure;

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Exemplary embodiments of the present disclosure will be described herein below with reference to the accompanying drawings. In the following description, well-known functions or constructions are not described in detail since they would obscure the disclosure in unnecessary detail.

Each of electronic devices of various types, such as smart phones or tablet Personal Computers (PCs), performs a multitasking operation for simultaneously processing a plurality of different application programs (hereinafter, referred to as applications). In order to perform the multitasking operation, one electronic device has an Operating System (OS) for simultaneously performing a plurality of tasks. For example, as shown in FIG. 1, an application list may be displayed on a display module of an electronic device such as a smart phone.

Figure 2:
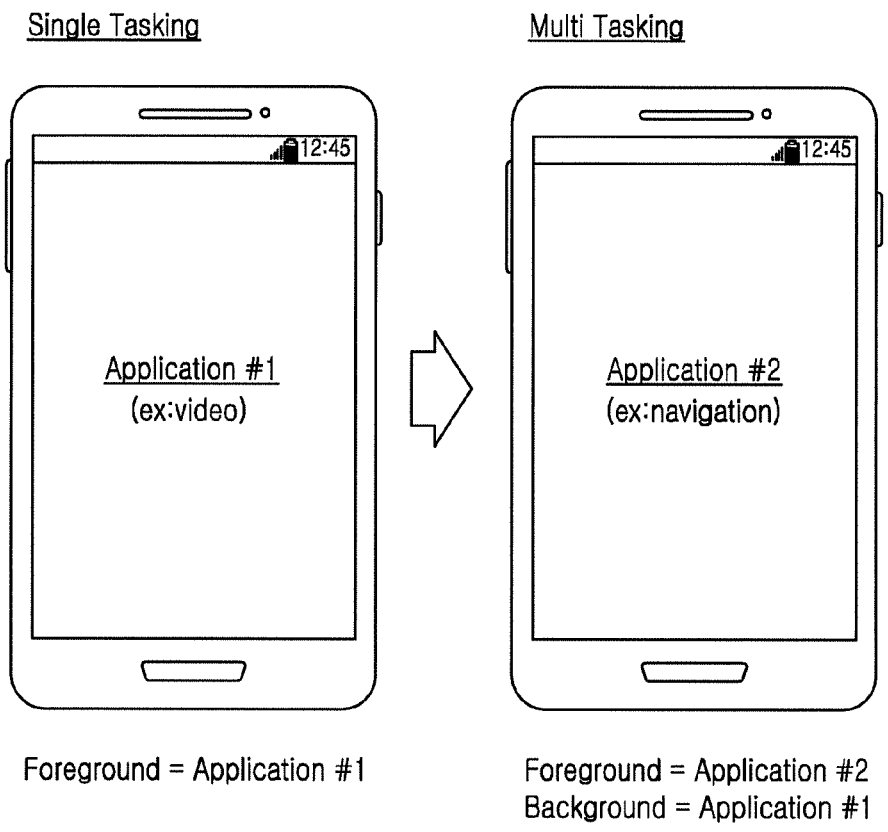
FIG. 2 is a screen illustrating an example process of executing a multitasking operation in a conventional electronic device according to this disclosure.

A user of the electronic device selects and executes a video application as a first application (application #1). As shown in FIG. 2, the video application of the application #1 is executed by a single tasking function. The video application of the application #1 is also executed as a foreground program. Thereafter, when the user selects and executes a navigation application as a second application (application #2), as also shown in FIG. 2, the navigation application of the second application simultaneously executes using a multitasking operation. For example, the navigation application of the application #2 can be executed as a foreground program. On the other hand, the video application of the application #1 can be changed to a background program and be continuously executed.

While the multitasking operation is performed, because the foreground program is a program of a higher priority and an operation state of the foreground program is displayed on an uppermost layer among multi-display layers, the user can see the operation state of the foreground program. On the other hand, while the multitasking operation is performed, because the background program is a program of a lower priority, it can be displayed as a semitransparent shape on a layer which is lower than the foreground program or around the foreground program. A part of the background program can be displayed or the background program can be displayed as thumbnails, and the like, on the layer which is lower than the foreground program or around the foreground program. The background program may not be displayed.

When a plurality of applications are simultaneously executed, because power is much consumed, for example, a method of efficiently reducing an amount of power consumed while the multitasking operation is performed becomes an important issue in each of the electronic devices such as smart phones or tablet PCs, when each of them use battery power.

An electronic device according to various embodiments of the present disclosure can be a device including a communication function. For example, the electronic device can be one or combination of one or more of various devices, such as a smart phone, a tablet PC, a mobile phone, a video phone, an e-book reader, a desktop PC, a laptop PC, a netbook computer, a Personal Digital Assistant (PDA), a Portable Multimedia Player (PMP), a Moving Picture Experts Group (MPEG) layer 3 (MP3) player, a mobile medical device, an electronic bracelet, an electronic necklace, electronic Appcessories, a camera, a wearable device, an electronic clock, a wristwatch, smart white appliances (such as a refrigerator, an air conditioner, a cleaner, a cybot, a TeleVision (TV), a Digital Versatile Disc (DVD) player, an audio, an oven, a microwave oven, a washing machine, an air cleaner, an electronic picture frame, etc.), various medical devices (such as a Magnetic Resonance Angiography (MRA), a Magnetic Resonance Imaging (MRI), a CT (Computed Tomography), an imaging apparatus, a ultrasonic machine, etc.), a navigation device, a Global Positioning System (GPS) receiver, an Event Data Recorder (EDR), a Flight Data Recorder (FDR), a set-top box, a TV box (such as Samsung HomeSync™, Apple TV™, or Google TV™), an electronic dictionary, a car infotainment device, electronic equipment for ship (such as a navigation device for ship, a gyrocompass, etc.), avionics, a security device, electronic clothes, an electronic key, a camcorder, a game console, a Head Mounted Display (HMD), a flat panel display, an electronic album, a part of furniture or a building/structure including a communication function, an electronic board, an electronic signature receiving device, or a projector. It is obvious to a person skilled in the art that the electronic device according to various embodiments of the present disclosure is not limited to the above-described devices.

Figure 3:
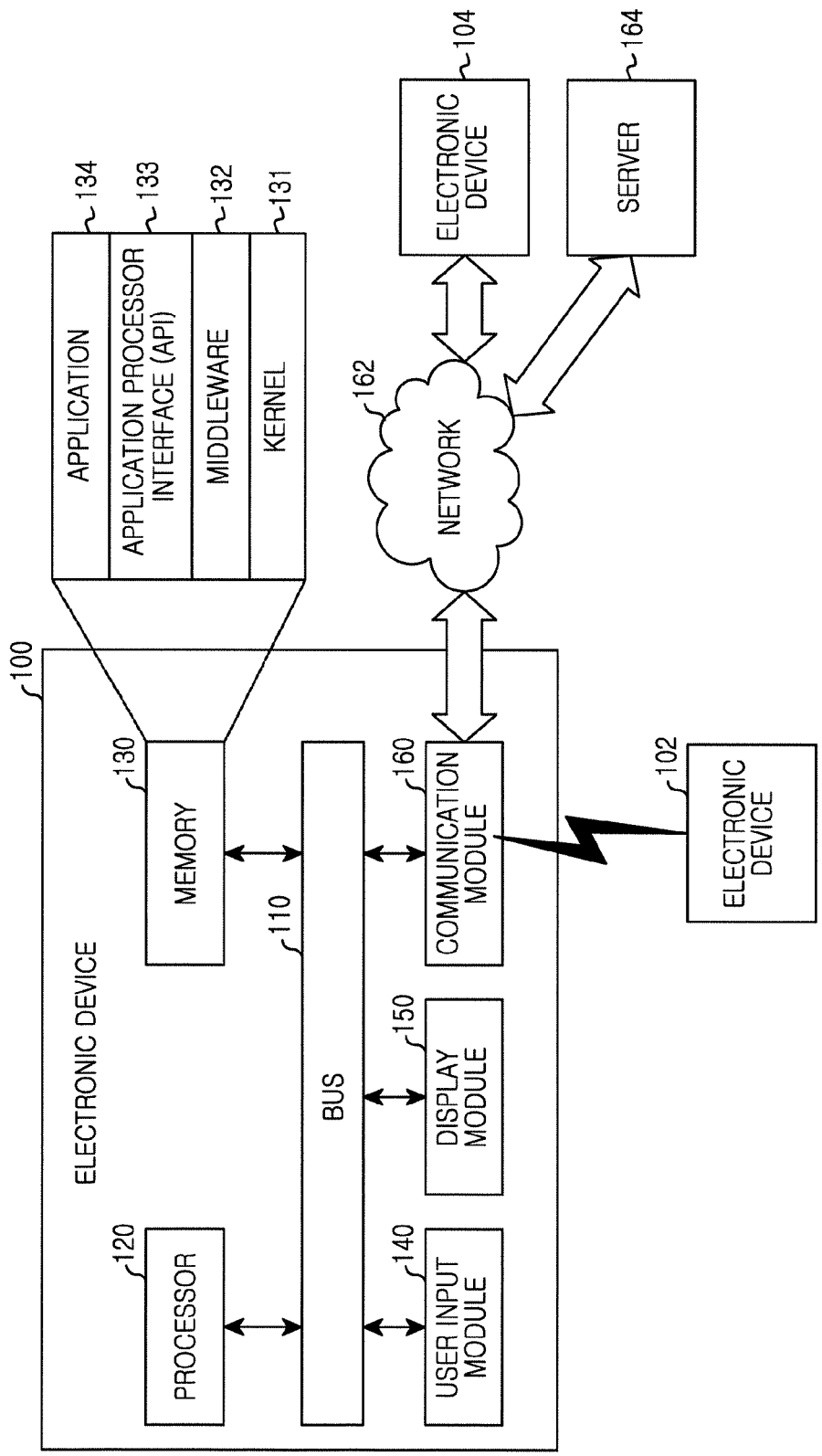
FIG. 3 is a block diagram illustrating an example configuration of an electronic device according to this disclosure.

FIG. 3 is a block diagram illustrating an example configuration of an electronic device according to this disclosure.

Referring to FIG. 3, the electronic device denoted by 100 includes a bus 110, a processor 120, a memory 130, a user input module 140, a display module 150, and a communication module 160.

The bus 110 is a circuit which connects the above-described components with each other and transmits communication (such as a control message) between the components.

The processor 120 receives, for example, commands from the above-described other components (such as the memory 130, the user input module 140, the display module 150, the communication module 160, and the like) through the bus 110, decodes the received commands, and performs a calculation or data processing according to the decoded commands.

The memory 130 stores commands or data which are received from the processor 120 or the other components (such as the user input module 140, the display module 150, the communication module 160, or the like) or are generated by the processor 120 or the other components. The memory 130 includes programming modules such as a kernel 131, a middleware 132, an Application Programming Interface (API) 133, or an application 134. Herein, the above-described respective programming modules can be composed of software, firmware, hardware, or combination of at least two or more of them.

The kernel 131 controls or manages system resources (such as the bus 110, the processor 120, or the memory 130, and the like) used to execute an operation or function implemented in the other programming modules, for example, the middleware 132, the API 133, or the application 134.

The kernel 131 provides an interface which can access a separate component of the electronic device 100 in the middleware 132, the API 133, or the application 134 and controls or manages the separate component.

The middleware 132 plays a role as a go-between such that the API 133 or the application 134 communicates with the kernel 131 and transmits and receives data with it. Also, the middleware 132 performs load balancing for work requests using a method of assigning priority which can use system resources (the bus 110, the processor 120, or the memory 130, and the like) of the electronic device 100 to, for example, at least one of the plurality of applications 134, in association with the work requests received from the plurality of applications 134.

The API 133 is an interface in which the application 134 controls a function provided from the kernel 131 or the middleware 132. For example, the API 133 can include at least one interface or function for file control, window control, image processing, or text control.

The user input module 140 receives, for example, commands or data from the user and transmits the received commands or data to the processor 120 or the memory 130 through the bus 110.

The display module 150 displays videos, images, or data to the user.

The communication module 160 performs communication between another electronic device 102 and the electronic device 100. The communication module 160 supports a local-area communication protocol (such as Wireless-Fidelity (Wi-Fi), BlueTooth (BT), Near Field Communication (NFC)), or certain network communication 162 (such as the Internet, a Local Area Network (LAN), a Wide Area Network (WAN), a telecommunication network, a cellular network, a satellite network, or a Plain Old Telephone Service (POTS), and the like). The communication module connects via network 162 to a server 164 or another electronic device 104. Each of the other electronic devices 102 and 104 can be the same (such as the same type) device as the electronic device 100 or a device (such as a different type) which is different from the electronic device 100.

Figure 4:
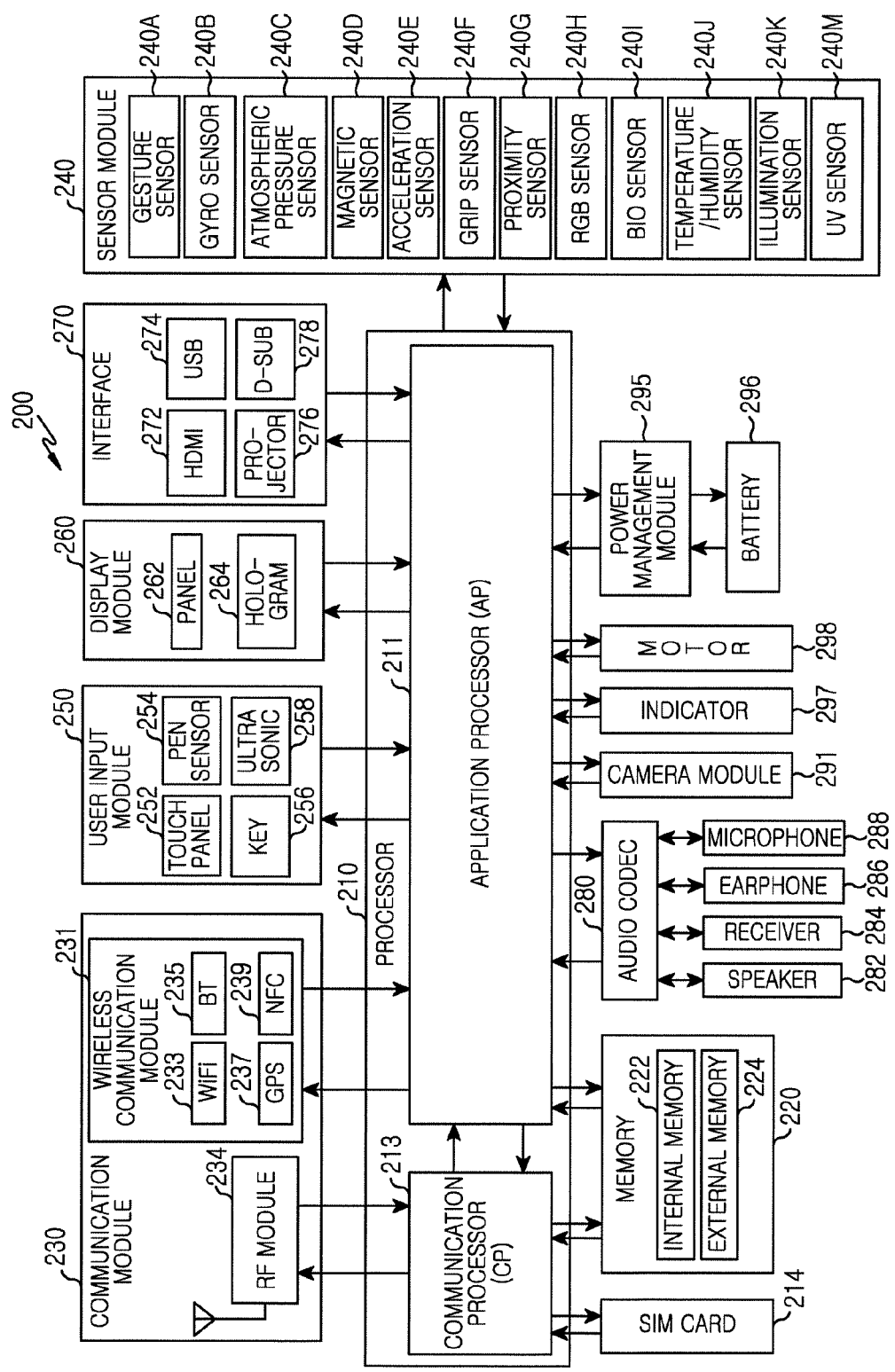
FIG. 4 is a block diagram illustrating an example detailed configuration of hardware according to this disclosure.

FIG. 4 is a block diagram illustrating an example detailed configuration of hardware according to this disclosure.

The hardware denoted by 200 can be, for example, the electronic device 100 shown in FIG. 3. Referring to FIGS. 3 and 4, the hardware 200 includes one or more processors 210, a Subscriber Identity Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 (such as the processor 120) can include one or more Application Processors (APs) 211 or one or more Communication Processors (CPs) 213. The processor 210 can be, for example, the processor 120 shown in FIG. 3. Although the AP 211 and the CP 213 shown in FIG. 4 are shown to be included in the processor 210, they can be included in different IC packages, respectively. In an embodiment, the AP 211 and the CP 213 can be included in one IC package.

The AP 211 executes an OS or an application program, controls a plurality of hardware or software components connected thereto, and processes and calculates various data including multimedia data. The AP 211 can be implemented as, for example, a System on Chip (SoC). The processor 210 can further include a Graphic Processing Unit (GPU).

The CP 213 performs a function for managing a data link in communication between an electronic device (such as the electronic device 100) including the hardware 200 with other electronic devices connected with the electronic device through a network and changing a communication protocol. The CP 213 can be implemented as, for example, a SoC. The CP 213 performs at least a part of a multimedia control function. The CP 213 identifies and authenticates, for example, a terminal in a communication network using an SIM (such as the SIM card 214). Also, the CP 213 can provide services, such as a voice communication service, a video communication service, a text message service, or a packet data service, to a user of the hardware 200.

Also, the CP 213 controls data transmission and reception of the communication module 230. In FIG. 4, components such as the CP 213, the power management module 295, or the memory 220 are shown as components which are separated from the AP 211. However, the AP 211 can be implemented to include at least some (such as the CP 213) of the above-described components.

The AP 211 or the CP 213 loads and processes commands or data received from at least one of a non-volatile memory or another component connected thereto to a volatile memory. Also, the AP 211 or the CP 213 stores data which are received from at least one of other components or are generated by at least one of other components in a non-volatile memory.

The SIM card 214 is a card implementing an SIM. The SIM card 214 can be inserted into a slot formed in a specific position of the electronic device. The SIM card 214 includes unique identification information (such as an Integrated Circuit Card IDentity (ICCID)) or subscriber information (such as an International Mobile Subscriber Identity WSW.

The memory 220 includes an internal memory 222 or an external memory 224. The memory 220 can be, for example, the memory 130 shown in FIG. 3. The internal memory 222 includes, for example, at least one of a volatile memory (such as a Dynamic Random Access Memory (DRAM), a Static RAM (SRAM), or a Synchronous Dynamic RAM (SDRAM), etc.) or a non-volatile memory (such as an One Time Programmable Read Only Memory (OTPROM), a PROM, an erasable PROM (EPROM), an Electrically Erasable PROM (EEPROM), a mask ROM, a flash ROM, a NAND flash memory, or a NOR flash memory, etc.). The internal memory 222 can have a type of a Solid State Disk (SSD). The external memory 224 can further include, for example, a Compact Flash (CF) card, a Secure Digital (SD) card, a micro-SD card, a mini-SD card, an extreme Digital (xD) card, or a memorystick, and the like.

The communication module 230 includes a wireless communication module 231 or a Radio Frequency (RF) module 234. The communication module 230 can be, for example, the communication module 160 shown in FIG. 3. The wireless communication module 231 includes, for example, a Wi-Fi module 233, a BT module 235, a GPS module 237, or an NFC module 239. For example, the wireless communication module 231 provides a wireless communication function using RFs. Additionally or alternatively, the wireless communication module 231 includes a network interface (such as a LAN card) or a modem, and the like for connecting the hardware 200 with the network (such as the Internet, a LAN, a WAN, a telecommunication network, a cellular network, a satellite network, or a POTS, and the like).

The RF module 234 is in charge of transmitting and receiving data, for example, an RF signal or a called electronic signal. The RF module 234 includes, for example, a transceiver, a Power Amplifier Module (PAM), a frequency filter, or a Low Noise Amplifier (LNA), and the like. Also, the RF module 234 further includes components such as conductors or conducting wires, for transmitting and receiving electromagnetic waves on a free space in wireless communication.

The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, and Blue (RGB) sensor 240H, a bio-sensor 240I, a temperature/humidity sensor 240J, an illumination sensor 240K, or a Ultra Violet (UV) sensor 240M. The sensor module 240 measures a physical quantity or sense an operation state of the electronic device, and converts the measured or sensed information into an electric signal. Additionally or alternatively, the sensor module 240 includes, for example, an Electronic-noise (E-nose) sensor (not shown), an ElectroMyoGraphy (EMG) sensor, an ElectroEncephaloGram (EEG) sensor, an ElectroCardioGram (ECG) sensor, or a fingerprint sensor, and the like. The sensor module 240 further includes a control circuit for controlling at least one or more sensors included therein.

The user input module 250 includes a touch panel 252, a (digital) pen sensor 254, a key 256, or an ultrasonic input device 258. The user input module 250 can be, for example, the user input module 140 shown in FIG. 3. The touch panel 252 recognizes touch input by, for example, at least one of a capacitive type, a resistive type, an infrared type, or an ultrasonic type. Also, the touch panel 252 further includes a controller. In case of the capacity type, the touch panel 252 recognizes not only a direct touch input but also a proximity touch input. The touch panel 252 can further include a tactile layer. In this case, the touch panel 252 provides a tactile response to the user. The (digital) pen sensor 254 is implemented, for example, using the same or similar method of receiving touch input of the user or using a separate sheet for recognition. The key 256 can be, for example, a keypad or a touch key.

The ultrasonic input device 258 is a device which senses sound waves using a microphone (such as the microphone 288) and verifies data in the electronic device through a pen which generates ultrasonic waves. The ultrasonic input device 258 performs wireless recognition. In an embodiment, the hardware 200 receives input of the user from an external device (such as the network 102 of FIG. 3, a computer, or the server 164 of FIG. 3) connected with the communication module 230 using the communication module 230.

The display module 260 includes a panel 262 or a hologram 264. The display module 260 can be, for example, the display module 150 shown in FIG. 3. The panel 262 can be, for example, a Liquid Crystal Display (LCD) or an Active Matrix-Organic Light-Emitting Diode (AM-OLED), and the like. The panel 262 can be implemented to be, for example, flexible, transparent, or wearable.

The panel 262 and the touch panel 252 can be integrated with each other to constitute one module. The hologram 264 shows stereoscopic images on the air using interference of light. The display module 260 further includes a control circuit for controlling the panel 262 or the hologram 264.

The interface 270 can include a High Definition Multimedia Interface (HDMI) 272, a Universal Serial Bus (USB) interface 274, a projector 276, or a D-sub (subminiature) interface 278. Additionally or alternatively, the interface 270 can include, for example, a Secure Digital/MultiMedia Card (SD/MMC) interface (not shown) or an Infrared Data Association (IrDA) interface.

The audio codec 280 converts voices and electronic signals in a two-way direction. The audio codec 280 can convert, for example, voice information input or output through a speaker 282, a receiver 284, an earphone 286, or the microphone 288.

The camera module 291 can be a device which captures images and videos. The camera module 291 can include, for example, one or more image sensors (such as a front lens or a rear lens), an Image Signal Processor (ISP), or a flash LED.

The power management module 295 manages power of the hardware 200. The power management module 295 can include, for example, a Power Management Integrated Circuit (PMIC), a charger IC, or a battery fuel gauge.

The PMIC can be mounted in, for example, an IC or an SoC semiconductor. A charging method of the power management module 295 can be classified into a wire charging method or a wireless charging method. The charger IC charges a battery and prevents inflow of overvoltage or overcurrent from a charger. The charger IC can include a charger IC for at least one of the wire charging method or the wireless charging method. The wireless charging method is, for example, a magnetic resonance method, a magnetic induction method, or an electromagnetic wave method. In the wireless charging method, additional circuits, for example, a coil loop, a resonance circuit, a rectifier, etc. for wireless charging can be added.

The battery fuel gauge can measure, for example, the remaining capacity of the battery 296, voltage in charging, current, or a temperature. The battery 296 generates electricity and supply power. For example, the battery 296 can be a rechargeable battery.

The indicator 297 indicates a specific state, for example, a booting state, a message state, or a charging state, and the like of the hardware 200 or a part of the hardware (such as the AP 211). The motor 298 converts an electric signal into a mechanical vibration. A Micro Control Unit (MCU) can control the sensor module 240.

The hardware 200 can further include a processing device (such as a GPU) for supporting a mobile TV. The processing device for supporting the mobile TV processes media data according to, for example, the standard of Digital Multimedia Broadcasting (DMB), Digital Video Broadcasting (DVB), or mediaflow.

Names of the above-described components of the hardware according to one embodiment of the present disclosure can differ according to kinds of electronic devices. The hardware according to one embodiment of the present disclosure can be configured to include at least one of the above-described components. Some components of the hardware can be omitted or the hardware can further include other additional components. Also, some of the components of the hardware according to one embodiment of the present disclosure are combined and configured as one entity. Therefore, the one device can equally perform functions of the corresponding components before some of the components are combined.

Figure 5:
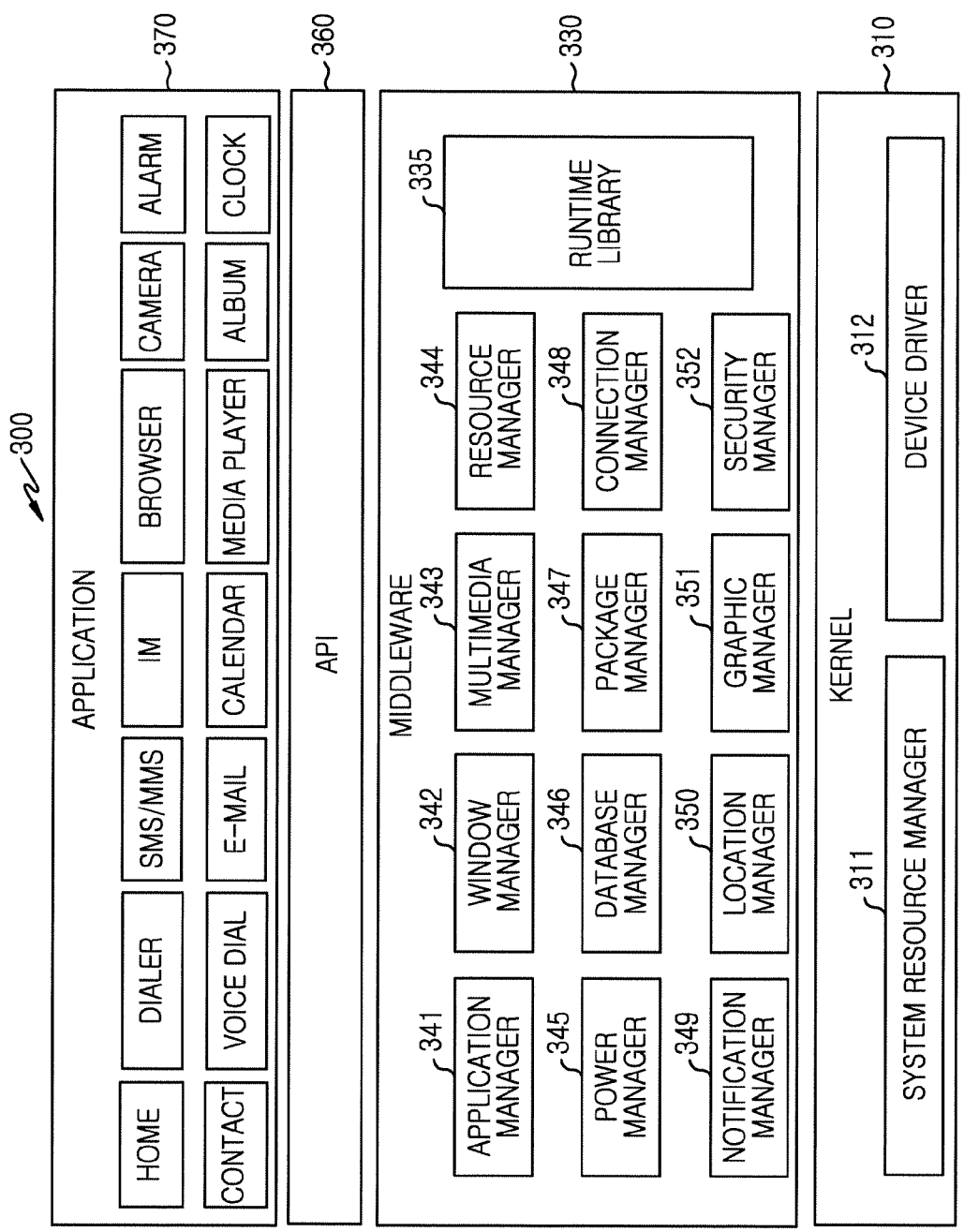
FIG. 5 is a block diagram illustrating a detailed configuration of an example programming module according to this disclosure.

FIG. 5 is a block diagram illustrating an example detailed configuration of a programming module according to this disclosure.

The programming module denoted by 300 can be included (such as stored) in the electronic device 100 (such as the memory 130) shown in FIG. 3. At least a part of the programming module 300 can be configured by software, firmware, hardware, or combination of two or more of them.

The programming module 300 includes an OS which is implemented in hardware (such as the hardware 200 of FIG. 2) and controls resources related to an electronic device (such as the electronic device 100) or a plurality of applications (such as an application 370) executed in the OS. For example, the OS can be Android, iOS, Windows, Symbian, Tizen, or Bada, and the like. Referring to FIGS. 3 to 5, the programming module 300 includes a kernel 310, middleware 330, an API 360, or the application 370.

The kernel 310 (such as the kernel 131) includes a system resource manager 311 or a device driver 312. The system resource manager 311 can include, for example, a process management unit, a memory management unit, or a file system management unit, and the like. The system resource manager 311 can control, assign, or collect, and the like system resources. The device driver 312 can include, for example, a display driver, a camera driver, a Bluetooth driver, a shared memory driver, a USB driver, a keypad driver, a Wi-Fi driver, or an audio driver. Also, the device driver 312 can include an Inter-Process Communication (IPC) driver.

The middleware 330 includes a plurality of modules which are previously implemented to provide functions the application 370 needs in common. Also, the middleware 330 provides functions through the API 360 such that the application 370 uses limited system resources in the electronic device efficiently. For example, as shown in FIG. 5, the middleware 330 (such as the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 355 includes, for example, a library module used by a compiler to add a new function through a programming language while the application 370 is executed. The runtime library 355 can perform a function for input and output, memory management, or an arithmetic function. The application manager 341 can manage, for example, a life cycle of at least one of the applications 370. The window manager 342 manages Graphic User Interface (GUI) resources used on a screen of the electronic device.

The multimedia manager 343 ascertains a format necessary for reproducing various media files and encodes or decodes a media file using a codec corresponding to the corresponding format. The resource manager 344 manages source codes of at least one of the applications 370, and manages resources of a memory or storage, and the like. The power manager 345 acts with a Basic Input Output System (BIOS), manages a battery or a power source, and provides power information necessary for an operation. The database manager 346 performs a management operation to generate, search, or change a database to be used in at least one of the applications 370.

The package manager 347 manages installation or updates of an application distributed by a type of a package file. The connectivity manager 348 can manage, for example, wireless connection such as Wi-Fi or BT, and the like. The notification manager 349 displays or notifies events such as an arrival message, an appointment, and proximity notification by a method which is not disturbed to the user. The location manager 350 manages location information of the electronic device.

The graphic manager 351 manages a graphic effect to be provided to the user or a UI related to the graphic effect. The security manager 352 provides all security functions necessary for system security or user authentication, and the like. When the electronic device (such as the electronic device 100) has a phone function, the middleware 330 further includes a telephony manager for managing a voice or video communication function of the electronic device.

The middleware 330 generates and uses a new middleware module through combination of various functions of the above-described internal component modules. The middleware 330 provides a module which specializes while being classified according to kinds of Oss to provide a differentiated function. Also, the middleware 330 dynamically deletes some of old components or add new components. Also, some of the components described in various embodiments of the present disclosure can be omitted, other components can be further added, or components having different names for performing similar functions can be replaced.

The API 360 (such as the API 133) as a set of API programming functions can be provided as different components according to OSs. For example, in case of Android or iOS, one API set is provided while being classified according to platforms. In case of Tizen, for example, two or more API sets is provided.

The application 370 (such as the application 134) includes, for example, a preload application or a third party application. At least a part of the programming module 300 is implemented as instructions stored in computer-readable storage media. One or more processors performs functions corresponding to the instructions when the instructions are executed by the one or more processors (such as the processor 210).

The computer-readable storage media is, for example, the memory 260. At least a part of the programming module 300 is, for example, implemented (such as executed) by the processor 210. At least a part of the programming module 300 can include, for example, a module, a program, a routine, a set of instructions, or a process, and the like, for performing one or more functions.

Names of the components of the programming module (such as the programming module 300) can differ according to kinds of OSs. Also, the programming module can include at least one or more of components. Some of the components can be omitted. The programming module according to one embodiment of the present disclosure can further include additional other components.

Hereinafter, a description will be given for an operation of the present disclosure in details with reference to the attached drawings. When it is determined that a detailed description for related well-known functions or constitutions can cloud the subject matter of the present disclosure unnecessarily in describing the present disclosure, the detailed description can be omitted. Terms which will be described later are terms defined in consideration of functions in the present disclosure and can be changed according to intent of a user and operator or custom, and the like. Therefore, the definitions can be given based on contents throughout the present specification.

Hereinafter, a description will be given in detail for a multitasking method and an electronic device. The electronic device can include the components shown in FIG. 4. For example, when executing a certain first application selected through a UI for the first time, the processor 210 of the electronic device 200 receives a launch request and receives an ID of the first application from an application manage daemon.

Thereafter, simultaneously executing a second application selected through a UI, the processor 210 performs a multitasking operation, executes the second application as a foreground program, and changes the first application to a background program. Also, the processor 210 changes a state of the first application to a freeze state which is a sleep mode with a small amount of power consumption or execute the first application continuously in an unfreeze state which is an operation mode. Here, the foreground program is a program of a higher priority while the processor 210 executes the multitasking operation. The background program is a program of a lower priority while the processor 210 executes the multitasking operation. The foreground program and the background program can be referred to as certain other names.

On the other hand, the processor 210 generates and manages a real-time process management table corresponding to the foreground program, the background program, and the respective applications which are in the freeze state of the sleep mode and the unfreeze state of the operation mode. Herein, a sleep mode and an operation mode of hardware can be referred to as an idle state and an activation state, respectively. A sleep mode and an operation mode of an application program which is software can be referred to as a freeze state and an unfreeze state, respectively.

Figure 6:
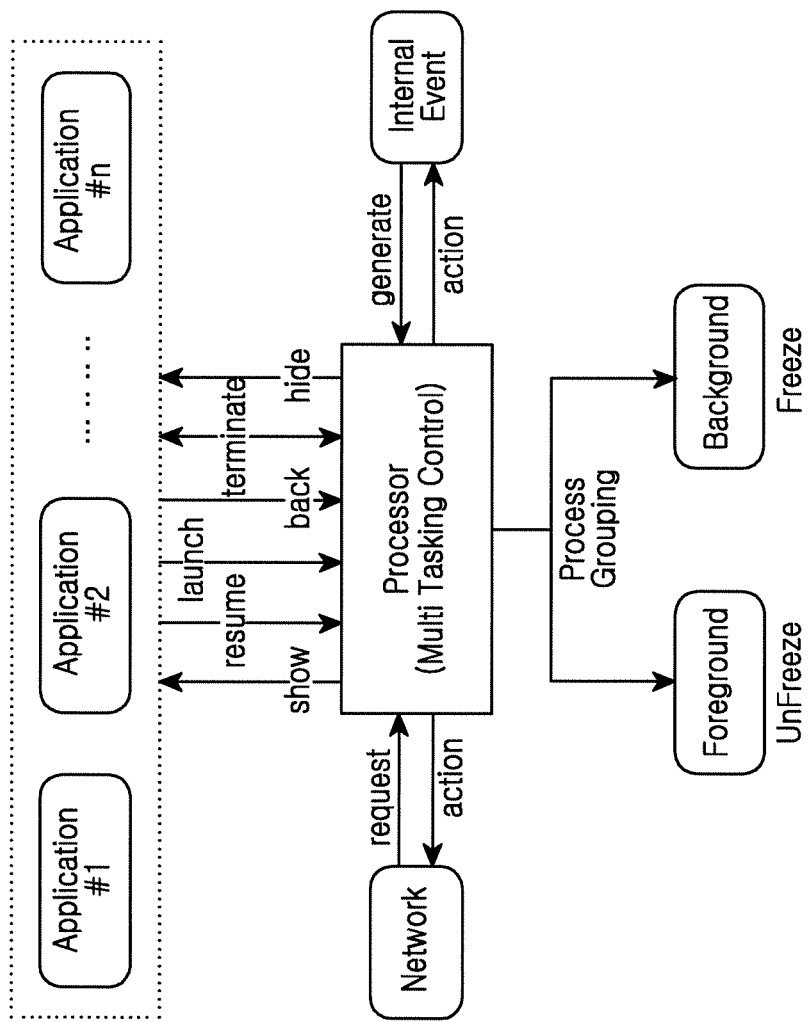
FIG. 6 is a diagram illustrating an example process of schematizing a multitasking control operation of a processor according to this disclosure.

FIG. 6 is a diagram illustrating an example process of schematizing a multitasking control operation of a processor according to this disclosure.

For example, as shown in FIGS. 4 and 6, the processor 210 performs various processing operations, such as a show operation, a resume operation, a launch operation, a back operation, a terminate operation, and a hide operation, for a plurality of applications #1 to #n. Also, the processor 210 performs an action to a request received through a network or performs an action to an internal event generated in an electronic device, and performs a multitasking control operation.

For example, performing a multitasking operation, the processor 210 executes an application of a foreground program in an unfreeze state, and changes a state of an application of a background program to a freeze state which is a sleep mode with a small amount of power consumption or executes the application of the background program in an unfreeze state which is a normal operation mode according to identification information, an activation state, and the like of the corresponding application. Also, the processor 210 manages the plurality of applications #1 to #n efficiently by grouping them into a foreground program group or a background group.

Figure 7:
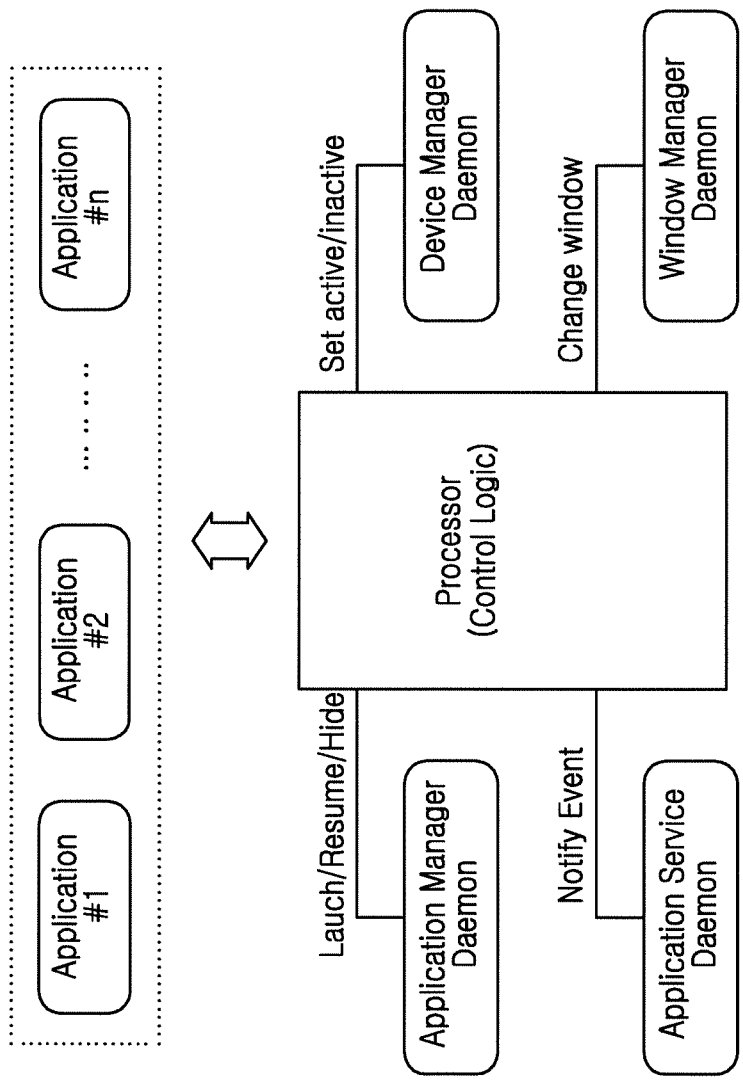
FIG. 7 is a diagram illustrating an example process of schematizing a control logic of a processor according to this disclosure.

FIG. 7 is a diagram illustrating an example process of schematizing control logic of a processor according to this disclosure.

For example, as shown in FIGS. 4 and 7, processing operations, such as a launch operation, a resume operation, and a hide operation, for a plurality of applications #1 to # n, the processor 210 performs an interface operation with an application manager daemon which manages a lifecycle of each of the plurality of applications #1 to # n. Processing an operation, such as a notify event operation, for each of the plurality of applications #1 to # n, the processor 210 performs an interface operation with an application service daemon which controls notification of each of the plurality of applications #1 to # n.

Processing an operation for determining whether each of the plurality of applications #1 to # n is in an active/inactive state, the processor 210 performs an interface operation with a device manager daemon which manages an activation state of each of the plurality of applications #1 to # n. Processing an operation such as a window change operation, the processor 210 performs an interface operation with a window manager daemon which controls visibility of each of the plurality of applications #1 to # n.

FIG. 8 illustrates an example real-time process management table according to this disclosure.

For example, as shown in FIG. 8, the real-time process management table includes a plurality of information, such as Program IDentification (PID) information, application name information, PID list information, current position information, current state information, and exclude code information, for each of a plurality of applications.

The current state information indicates a freeze or unfreeze state. The current position information indicates a foreground or background program. The exclude code information indicates that a corresponding application is an application which must be executed in an unfreeze state irrespective of a current position. The PID list information indicates, for example, that a plurality of applications, in which a browser will be executed, which are interdependent, are executed together as groups.

For example, as shown in FIG. 8, an application whose PID is 112 and an application whose PID is 113 is managed as one group in the PID list information to execute a browser. On the other hand, the processor 210 presets and manages applications, which is continuously executed in an unfreeze state always on a white list, irrespective of current position information based on the exclude code information.

FIG. 9 is a table illustrating an example white list according to one embodiment of the present disclosure.

For example, as shown in FIG. 9, the white list includes a white list number, an application type, an application name, and the like.

Applications included in the white list can include applications, such as a cluster home application, a menu screen application, a system popup application, and a notification panel application, as applications which must be always executed in an unfreeze state.

Figure 10:
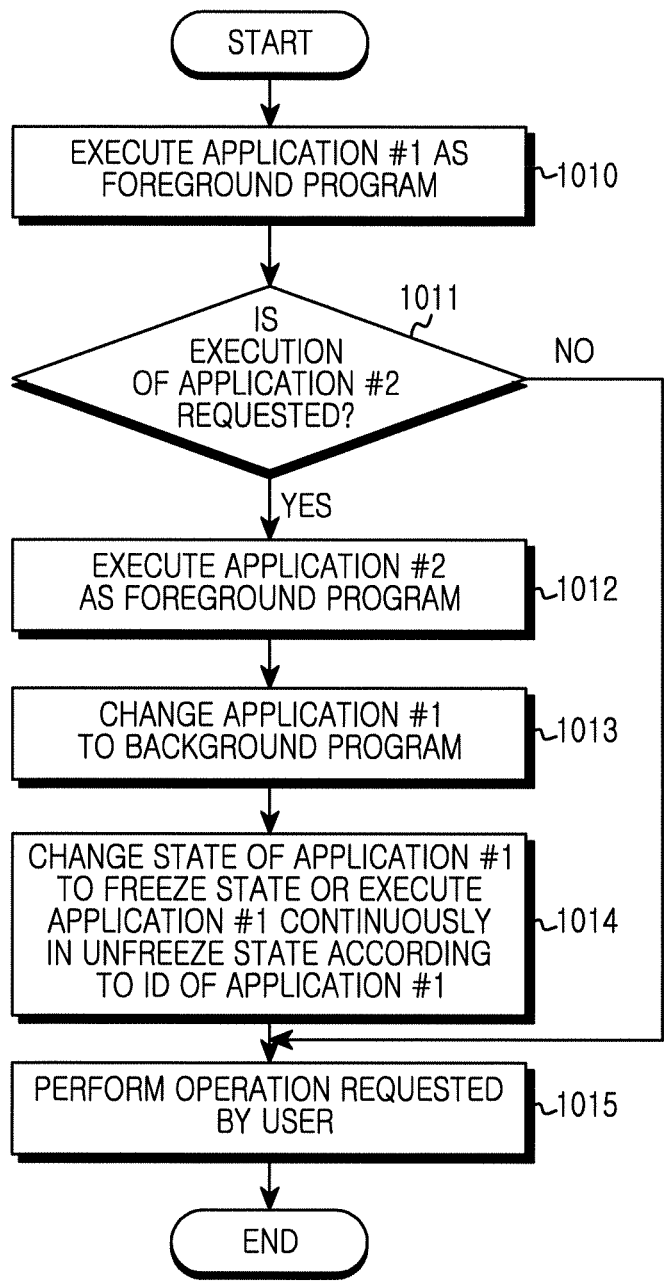
FIG. 10 is a flowchart illustrating an example operation process of a multitasking method of an electronic device according to this present disclosure.

FIG. 10 is a flowchart illustrating an example operation process of a multitasking method of an electronic device according to this disclosure.

For example, as shown in FIGS. 4 and 10, the processor 210 executes an application #1 as a foreground program according to a request of a user of the electronic device (step 1010).

When the user requests execution of an application #2 (step 1011), the processor 210 executes the application #2 as the foreground program (step 1012). The processor 210 changes the application #1 from the foreground program to a background program (step 1013). Herein, the processor 210 verifies an ID of the application #1, and changes a state of the application #1 changed to the background program to a freeze state with a small amount of power consumption or executes the application #1 continuously in an unfreeze state (step 1014). Thereafter, the processor 210 performs a corresponding operation requested by the user (step 1015).

For example, when the application #1 changed to the background program is not an application which must be continuously executed in the unfreeze state, the processor 210 reduces an amount of power consumption generated while performing a multitasking operation by changing a state of the application #1 to the freeze state with a small amount of power consumption.

Figure 11:
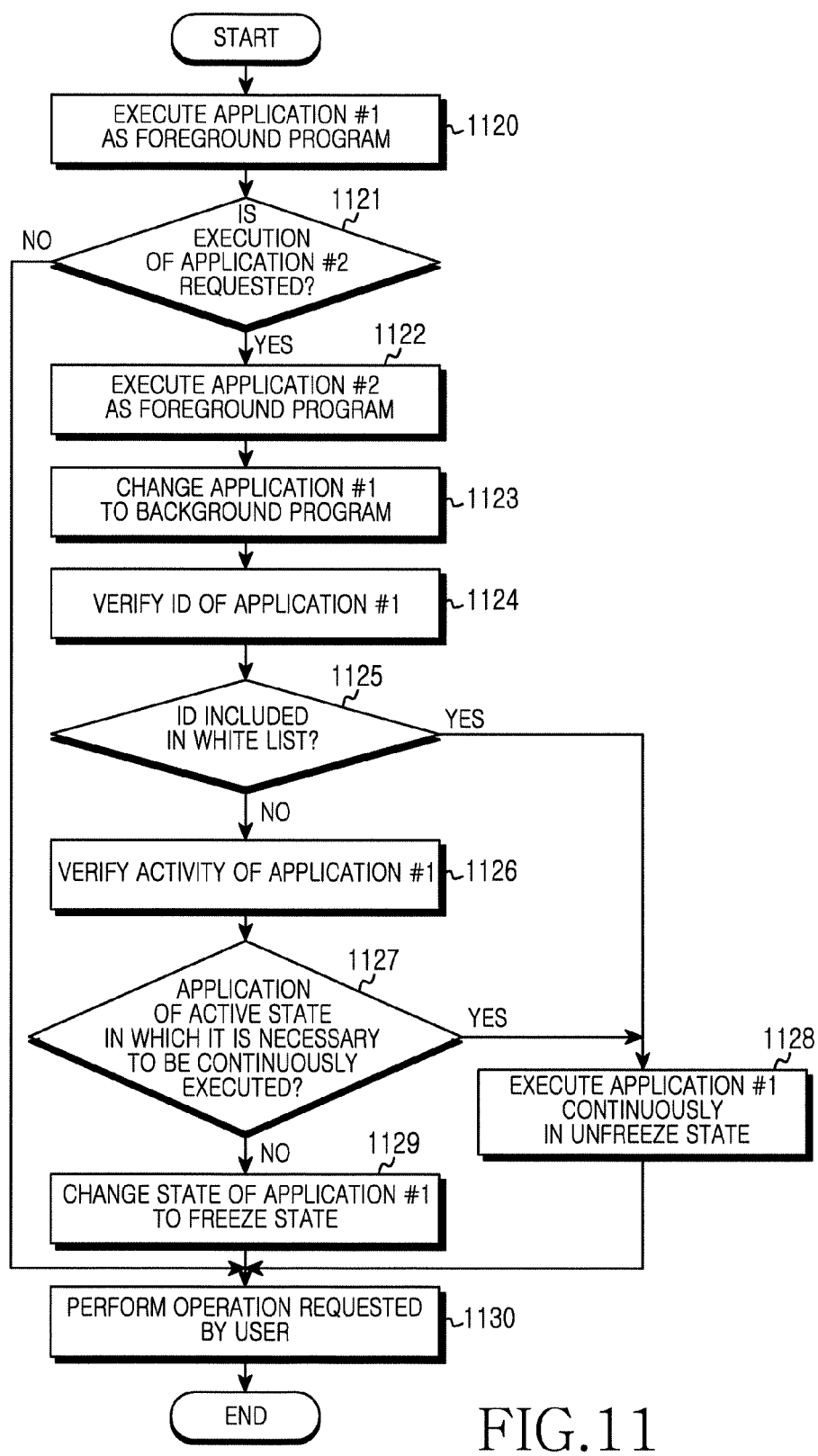
FIG. 11 is a flowchart illustrating an example detailed operation process of a multitasking method of an electronic device according to this disclosure.

FIG. 11 is a flowchart illustrating an example detailed operation process of a multitasking method of an electronic device according to this disclosure.

For example, as shown in FIGS. 4 and 11, when execution of an application #2 is requested while executing an application #1 as a foreground program (steps 1120 and 1121), the processor 210 executes the application #2 as the foreground program (step 1122). The processor 210 changes the application #1 from the foreground program to a background program (step 1123).

The processor 210 verifies an ID of the application #1 (step 1124). When the verified ID is an ID included in a white list (step 1125), the processor 210 executes the application #1 changed to the background program continuously in an unfreeze state. For example, as described above with reference to FIG. 9, the white list can include an ID of each of applications, such as a cluster home application, a menu screen application, a system popup application, and a notification panel application, which must be always in an unfreeze state, irrespective of whether to change the foreground program to the background program.

The processor 210 performs a comparison operation with the white list in a time point of when the application #1 is changed to the background program or perform a comparison operation with the white list previously in a time point of when the application #1 is executed for the first time. On the other hand, when the ID of the application #1 is not an ID included in the white list, the processor 210 verifies an activation state of the application #1 (step 1126).

When the application #1 is an application of an active state in which it is necessary to be continuously executed (step 1127), for example, when the application #1 is an application corresponding to music or navigation and a current state of the application #1 is an active state, the processor 210 changes the music or navigation application which is the application #1 to the background program and executes the application #1 continuously in the unfreeze state (step 1128). On the other hand, although the application #1 is the application corresponding to the music or navigation, when the current state is an inactive state, the processor 210 changes the music or navigation application which is the application #1 to the background program and changes a state of the application #1 to the freeze state to reduce an amount of power consumption (step 1129).

Thereafter, the processor 210 performs an operation requested by a user of the electronic device (step 1130). Included in the white list or corresponding to the music or navigation application which is in the active state, an application changed to the background program by a multitasking operation is continuously executed in the unfreeze state. On the other hand, when the application corresponds to one of the other applications and is in the inactive state, it is changed to the freeze state to reduce an amount of power consumption. That is, as shown in FIG. 12, although each of a cluster home application, a menu screen application, a system popup application, and a notification panel application, which is included in a white list, is changed to the background program, it is continuously executed in the unfreeze state to respond to a request of the user quickly.

Figure 13:
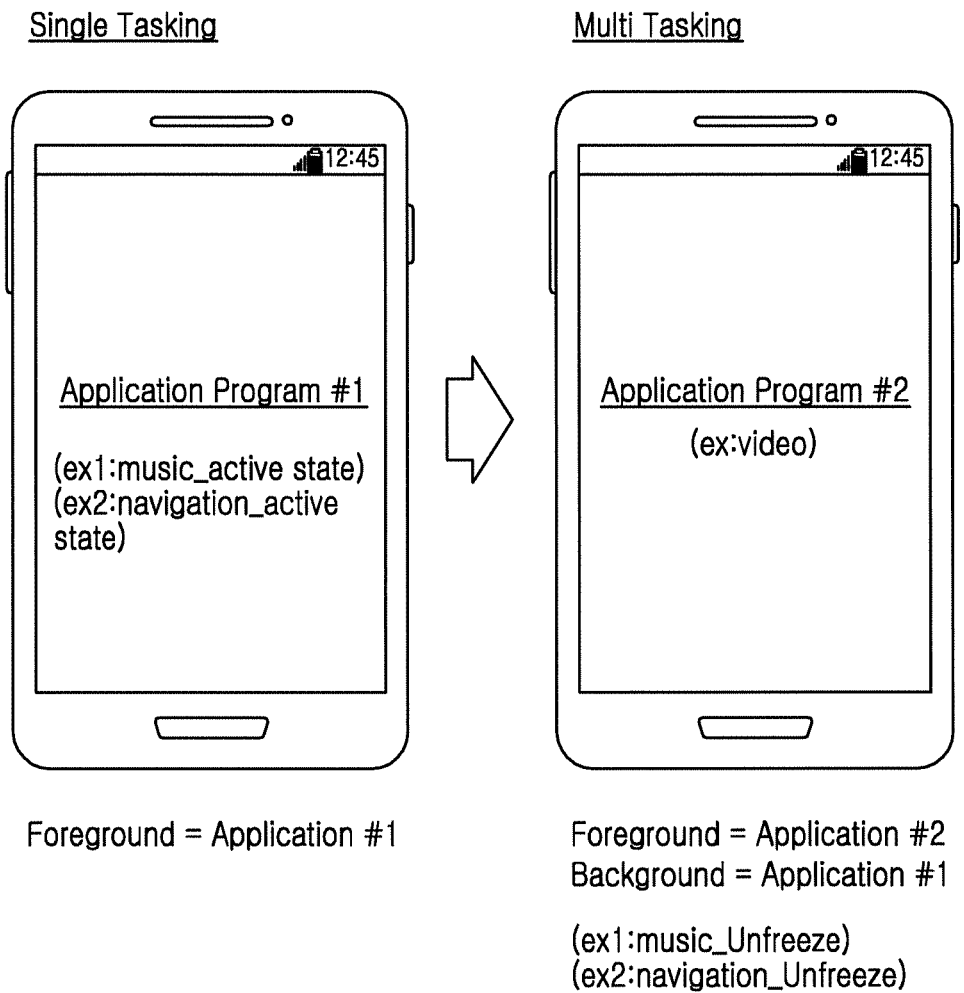
FIG. 13 is a screen illustrating an example process of changing a music or navigation application to a background program according to this disclosure.

Also, as shown in FIG. 13, although the music or navigation application which is in the active state is changed to the background program, it is continuously executed in the unfreeze state such that the user can listen to music continuously or trace location information through navigation continuously.

Figure 14:
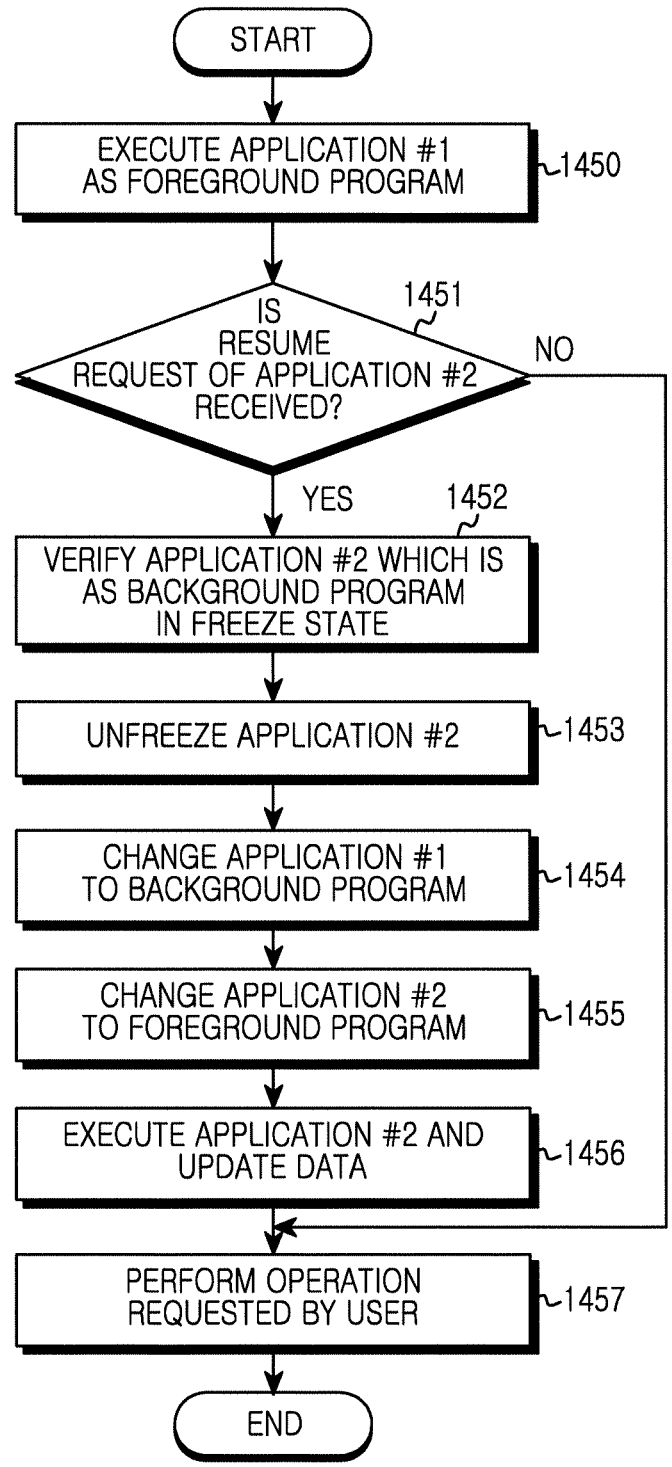
FIG. 14 is a flowchart illustrating an example detailed operation process corresponding to a resume request in a multitasking method of an electronic device according to this disclosure.

FIG. 14 is a flowchart illustrating an example detailed operation process corresponding to a resume request in a multitasking method of an electronic device according to this disclosure.

For example, as shown in FIGS. 4 and 14, when a resume request of an application #2 is received while executing an application #1 as a foreground program (steps 1450 and 1451), the processor 210 verifies whether the application #2 is as a background program in a freeze state (step 1452). For example, when the application #2 is a video application which is as the background program in the freeze state, the processor 210 unfreezes the application #2 of the video application (step 1453). The processor 210 changes the application #1 which is being executed as the foreground program to the background program (step 1454) and changes the unfrozen application #2 of the video to the foreground program (step 1455).

The processor 210 executes the application #2 changed to the foreground program and updates it as the latest data (step 1456) and performs an operation requested by a user of the electronic device (step 1457). For example, when a navigation application is changed from the background program to the foreground program, the processor 210 performs an operation requested by the user immediately by immediately receiving a GPS signal, and the like and updating a map image, and the like as the latest data to perform a normal operation quickly although there is no key input of the user.

On the other hand, changed to the background program, the application #1 can be changed to a freeze state or be continuously executed in an unfreeze state according to an ID or an activation state of the corresponding application. In addition, the application #1 can be continuously executed as the foreground program without being changed to the background program by being grouped into a foreground program group.

Figure 15:
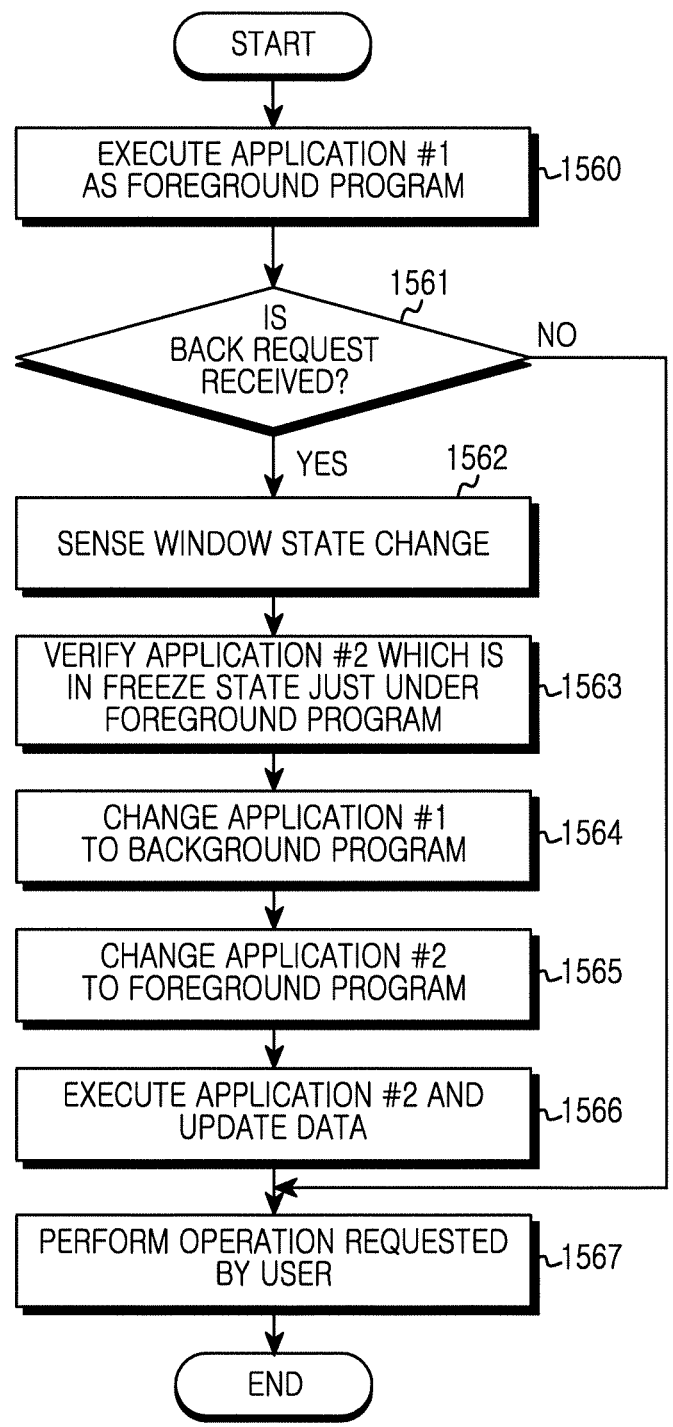
FIG. 15 is a flowchart illustrating an example detailed operation process corresponding to a back request in a multitasking method of an electronic device according to this disclosure.

FIG. 15 is a flowchart illustrating an example detailed operation process corresponding to a back request in a multitasking method of an electronic device according to this disclosure.

For example, as shown in FIGS. 4 and 15, when a back request is received through a UI while executing an application #1 as a foreground program (steps 1560 and 1561), the processor 210 senses a window state change from a window manager daemon (step 1562).

The processor 210 verifies a background program just under the foreground program (step 1563). For example, when an application #2 is as the background program in a freeze state just under the foreground program, the processor 210 changes the application #1 to the background program (step 1564). The processor 210 changes the application #2 to the foreground program (step 1565). Also, the processor 210 unfreezes and executes the application #2 and updates the application #2 as the latest data (step 1566). The processor 210 performs an operation requested by a user of the electronic device (step 1567).

On the other hand, changed to the background program, the application #1 can be changed to a freeze state or be continuously executed in an unfreeze state according to an ID or an activation state of the corresponding application. In addition, the application #1 can be continuously executed as the foreground program without being changed to the background program by being grouped into a foreground program group.

Figure 16:
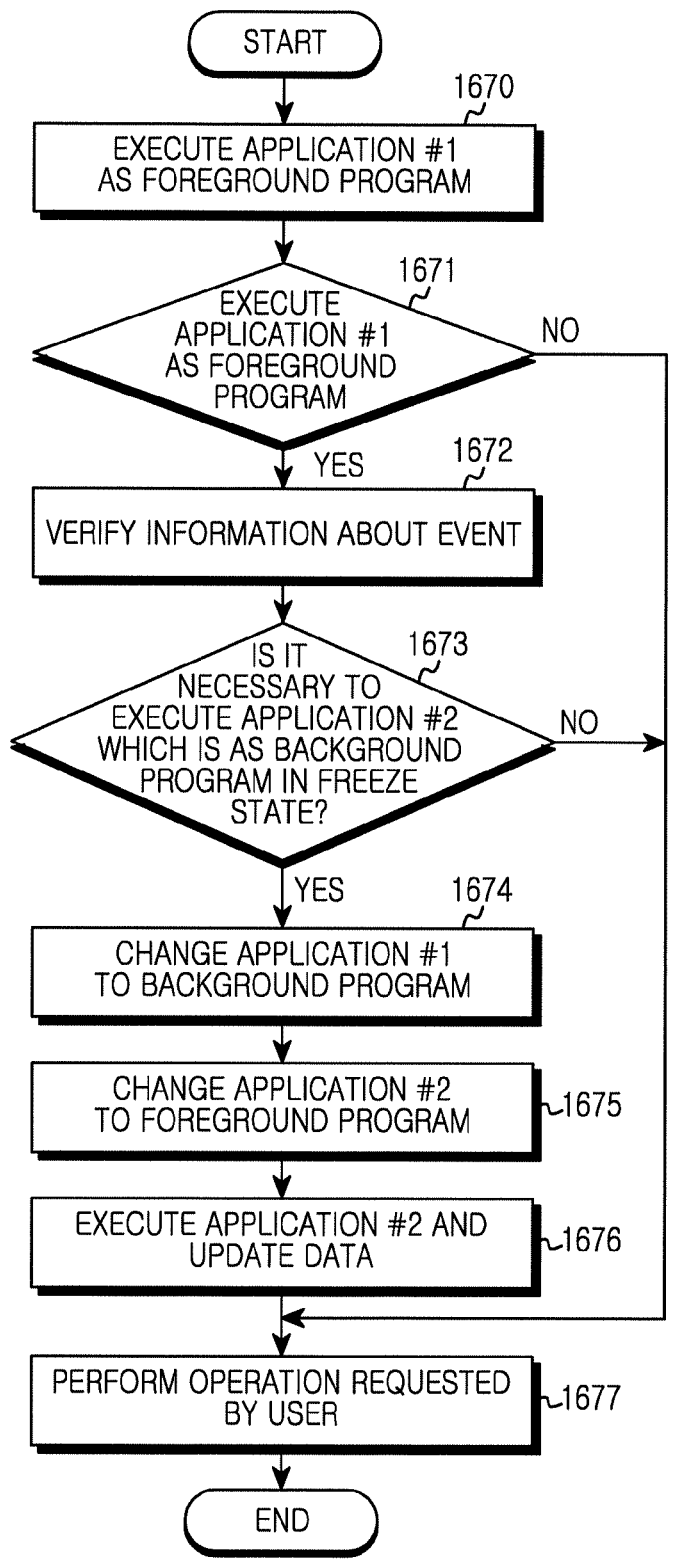
FIG. 16 is a flowchart illustrating an example detailed operation process corresponding to an event request in a multitasking method of an electronic device according to this disclosure.

FIG. 16 is a flowchart illustrating an example detailed operation process corresponding to an event request in a multitasking method of an electronic device according to this disclosure.

For example, as shown in FIGS. 4 and 16, when an external event is received through a network or an internal event generated in the electronic device is received while executing an application #1 as a foreground program (steps 1670 and 1671), the processor 210 verifies information about the event. For example, information about the external or internal event can be one or more of Short Message Service (SMS) information, Multimedia Message Service (MMS) information, push information, call information, and alarm information.

Verifying the event information (step 1672), the processor 210 determines whether it is necessary to execute an application #2 which is as a background program in a freeze state currently (step 1673). For example, as a result of receiving MMS information which is an external event through a network or receiving alarm information which is an internal event generated in the electronic device and verifying the received information, when it is necessary to execute the application #2 which is as the background program in the freeze currently, the processor 210 changes the application #1 to the background program (step 1674). The processor 210 changes the application #2 to the foreground program (step 1675).

Also, the processor 210 unfreezes and executes the application #2 and updates the application #2 as the latest data (step 1676). The processor 210 performs an operation requested by a user of the electronic device (step 1677). On the other hand, changed to the background program, the application #1 can be changed to a freeze state or be continuously executed in an unfreeze state according to an ID or an activation state of the corresponding application. In addition, the application #1 can be continuously executed as the foreground program without being changed to the background program by being grouped into a foreground program group.

Figure 17:
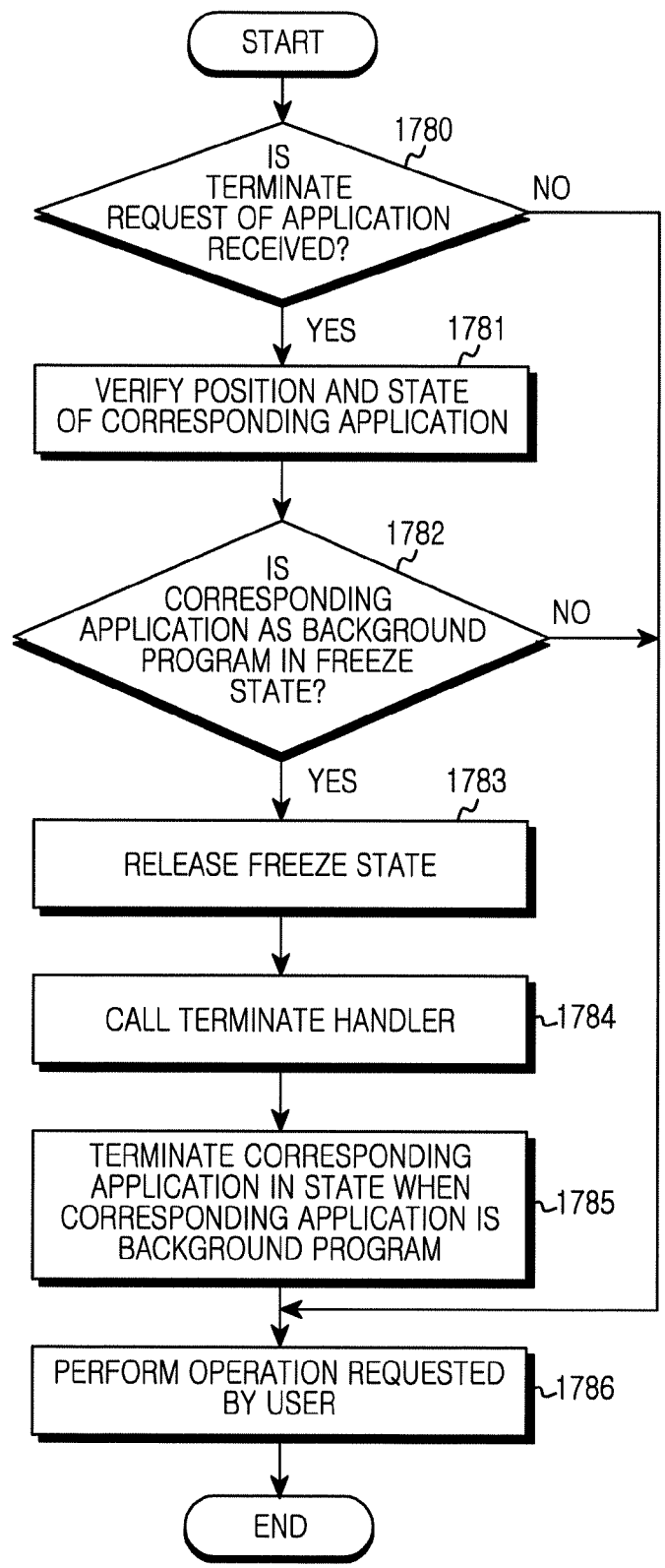
FIG. 17 is a flowchart illustrating an example detailed operation process corresponding to a terminate request in a multitasking method of an electronic device according to this disclosure.

FIG. 17 is a flowchart illustrating an example detailed operation process corresponding to a terminate request in a multitasking method of an electronic device according to this disclosure.

For example, as shown in FIGS. 4 and 17, when a terminate request of an application is received, the processor 210 verifies a position and a state of the corresponding application (steps 1780 and 1781). For example, when the application in which the terminate request is received is an application which is as a background program in a freeze state currently (step 1782), the processor 210 releases the freeze state in a state where the corresponding application is the background program without changing the corresponding application to a foreground program (step 1783).

The processor 210 calls a terminate handler (step 1784). The processor 210 terminates the corresponding application in the state where the corresponding application is the background program (step 1785). The processor 210 performs an operation requested by a user of the electronic device (step 1786). Therefore, the processor 210 can terminate the corresponding application efficiently without changing the application which is as the background program in the freeze state to the foreground program unnecessarily.

Figure 18:
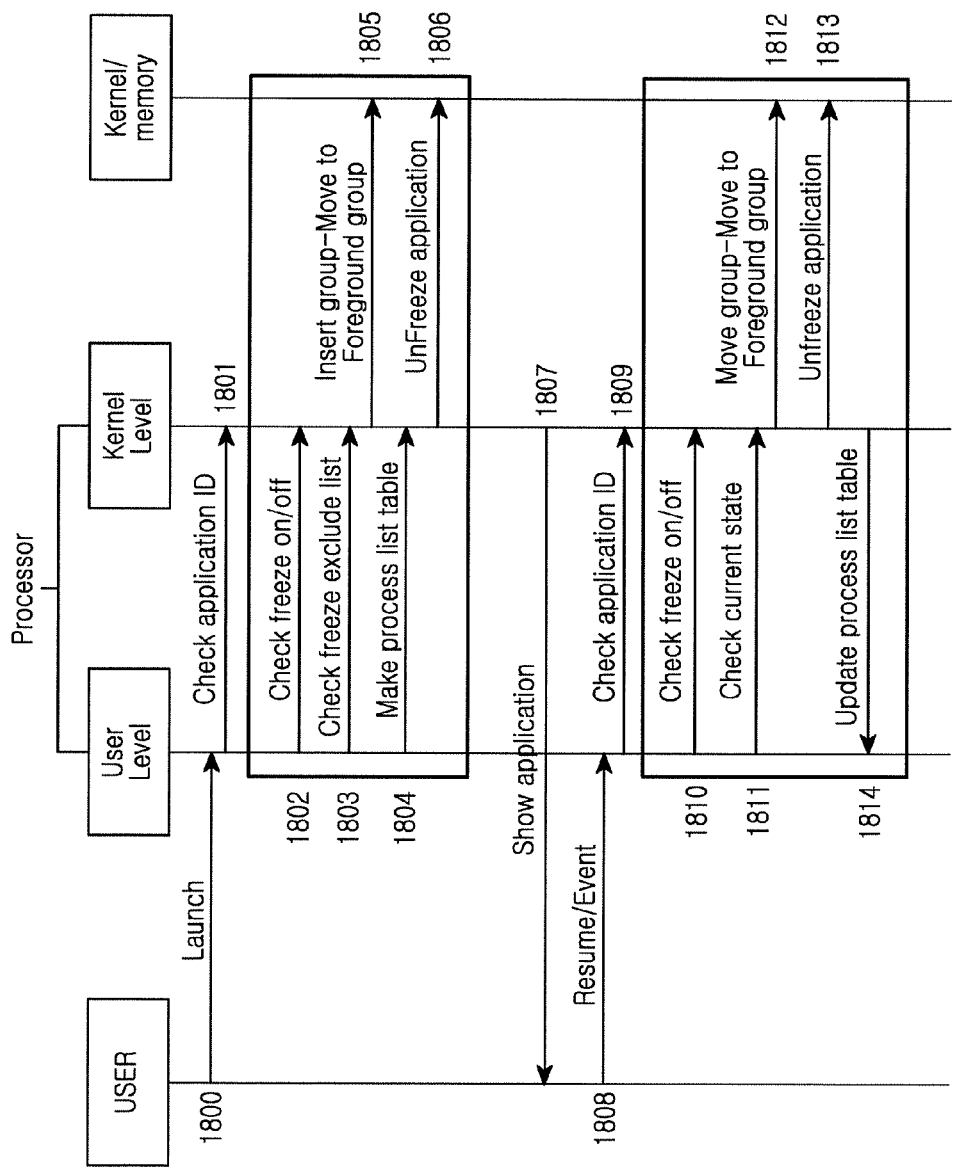
FIG. 18 is a signal sequence diagram illustrating an example process corresponding to a launch request and a resume/event request of an application according to this disclosure.

FIG. 18 is a signal sequence diagram illustrating an example process corresponding to a launch request and a resume/event request of an application according to this disclosure.

For example, as shown in FIGS. 4 and 18, the processor 210 can be classified into a user level for an interface with a user of an electronic device and a kernel level for an interface with a kernel.

The processor 210 performs an operation (step 1801) of checking an ID of a corresponding application, an operation (step 1802) of checking a freeze on/off, and an operation (step 1803) of checking a freeze exclude list using a white list in response to a launch request (step 1800) of the user. The processor 210 performs an operation (step 1804) of making a process list table for the corresponding application as a result of the checked result.

Also, the processor 210 performs an insert group operation (step 1805) of moving the corresponding application to a foreground program group and an operation (step 1806) of executing the corresponding application as an unfreeze application of a foreground program successively, based on the generated process list table. At this time, the user can see whether to execute the corresponding application (step 1807). On the other hand, the processor 210 performs an operation (step 1809) of checking an ID of the corresponding application, an operation (step 1810) of checking a freeze on/off, and an operation (step 1811) of checking a current state in response to receiving (step 1808) a resume request or an internal/external event of the user.

Also, the processor 210 performs a move group operation (step 1812) of moving the corresponding application to a foreground program group and an operation (step 1813) of executing the corresponding application as an unfreeze application of the foreground program successively. The processor 210 performs an operation (step 1814) of updating the process list table in response to the performed result.

Figure 19:
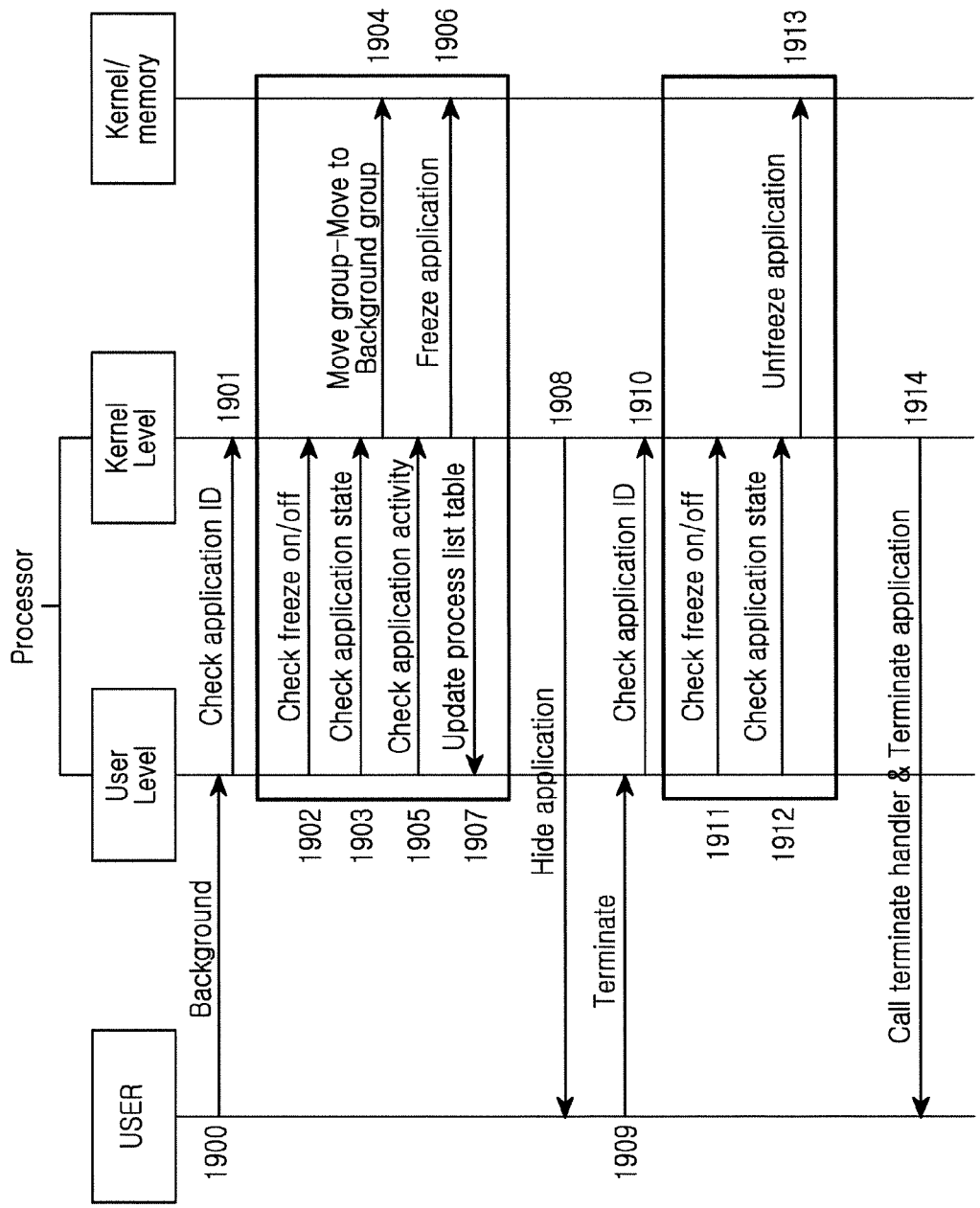
FIG. 19 is a signal sequence diagram illustrating an example process corresponding to a back request and a terminate request of an application according to this disclosure.

FIG. 19 is a signal sequence diagram illustrating an example process corresponding to a back request and a terminate request of an application according to this disclosure.

For example, as shown in FIGS. 4 and 19, the processor 210 performs an operation (step 1901) of checking an ID of a corresponding application, an operation (step 1902) of checking a freeze on/off, and operation (step 1903) of checking an application state in response to a back request (step 1900).

Also, the processor 210 performs a move group operation (step 1904) of moving the corresponding application to a background program group and an operation (step 1905) of checking application activity. When the corresponding application is an application without activity as a result of the check, the processor 210 performs an application freeze operation (step 1906) of freezing the corresponding application and an operation (step 1907) of updating a process list table in response to the performed result. At this time, a user of the electronic device may not see whether to execute the corresponding application (step 1908).

On the other hand, the processor 210 performs an operation (step 1910) of checking an ID of the corresponding application, an operation (step 1911) of checking a freeze on/off, and an operation (step 1912) of checking an application state in response to a terminate request (step 1909).

Also, when the corresponding application is as the background program in a freeze state, the processor 210 performs an operation (step 1913) of unfreezing the corresponding application and an operation (step 1914) of calling a terminate hander and terminating the corresponding application successively. Therefore, the processor 210 can terminate the corresponding application efficiently without changing the application which is as the background program in the freeze state to the foreground program unnecessarily.

In an embodiment, the electronic device can save an amount of power consumption generated while performing a multitasking operation. The electronic device can limit resources used by an application which is being operated as a background program. The electronic device can limit resources used by an application which is not used.

Methods according to claims of the present disclosure or embodiments described in the specification of the present disclosure can be implemented as hardware, software, or combinational type of the hardware and the software.

When the method is implemented by the software, a computer-readable storage medium for storing one or more programs (software modules) can be provided. The one or more programs stored in the computer-readable storage medium are configured for being executed by one or more processors in an electronic device.

The one or more programs include instructions for allowing an electronic device to execute the methods according to this disclosure and/or the embodiments described in the specification of the present disclosure. These programs (software modules, software) can be stored in a Random Access Memory (RAM), a non-volatile memory including a flash memory, a Read Only Memory (ROM), an Electrically Erasable Programmable ROM (EEPROM), a magnetic disc storage device, a Compact Disc-ROM (CD-ROM), a Digital Versatile Disc (DVD) or an optical storage device of a different type, and a magnetic cassette.

The programs can be stored in a memory configured by combination of some or all of them. Also, the configured memory can include a plurality of memories. Also, the programs can stored in an attachable storage device which can access an electronic device through each of communication networks such as the Internet, an intranet, a Local Area Network (LAN), a Wide LAN (WLAN), and a Storage Area Network (SAN) or a communication network configured by combination of them. This storage device can connect to the electronic device through an external port. Also, a separate storage device on a communication network can connect to a portable electronic device.

In an embodiment, elements included in this disclosure were expressed as a single element or a plurality of elements according to the detailed embodiments of the present disclosure. However, the single or plural expression is selected to be suitable for conditions given for convenience of description. This disclosure is not limited to the single element or the plurality of elements. Although there are elements expressed as a plurality of elements, they can be composed of a single element. Although there is an element expressed as a single element, it can be composed of a plurality of elements.

While the present disclosure has been particularly shown and described with reference to exemplary embodiments thereof, it will be understood by those skilled in the art that various changes in form and details can be made therein without departing from the spirit and scope of the present disclosure as defined by the appended claims.

What is claimed is:

1. A method of an electronic device, the method comprising:
displaying a user interface (UI) of a first application program executed in the electronic device as a foreground program; and
in response to executing a second application program in the electronic device as the foreground program, displaying a UI of the second application program by switching the first application program to a background program hiding the UI of the first application program,
wherein the first application program switched to the background program is operated in one of a freeze state or an unfreeze state based on whether the first application program is included in a white list according to identification information of the first application program,
wherein the white list comprises a predetermined list of application programs which is set to be continuously executed in the unfreeze state, and
wherein the freeze state comprises a sleep mode requiring resources for the first application program less than resources of the unfreeze state which is an active mode.

2. The method of claim 1, wherein displaying the UI of the second application program comprises continuously executing the first application program in the unfreeze state when the identification information of the first application program is included in the white list.

3. The method of claim 1, wherein the predetermined list of application programs comprises a list of identification information of each of application programs corresponding to one or more of a cluster home, a menu screen, a system popup, and a notification panel.

4. The method of claim 1, wherein displaying the UI of the second application program comprises continuously executing the first application program in the unfreeze state when the identification information of the first application program corresponds to one or more of music or navigation and the first application program is in an activation state just before the first application program is switched to the background program.

5. The method of claim 1, further comprising switching the first application program to the foreground program again, automatically updating data to operate normally, and executing the first application program in the unfreeze state when a resume request for the first application program of the freeze state is received.

6. The method of claim 1, further comprising switching the first application program to the foreground program again, automatically updating data to operate normally, and executing the first application program in the unfreeze state when a back request for the first application program of the freeze state is received.

7. The method of claim 6, wherein the first application program switched to the foreground program again by the back request is a background program just under the second application program.

8. The method of claim 1, further comprising switching the first application program to the foreground program again, automatically updating data to operate normally, and executing the first application program in the unfreeze state when an event for the first application program of the freeze state is received.

9. The method of claim 8, whether the event comprises an event corresponding to one or more of short message service (SMS) information, multimedia message service (MMS) information, push information, call information, and alarm information which are generated in the inside or the outside.

10. The method of claim 1, further comprising switching a state of the first application program to the unfreeze state and terminating the first application program in a state where the first application program is the background program when a terminate request for the first application program of the freeze state is received.

11. The method of claim 1, wherein the foreground program and the background program are managed as a group including at least one or more application programs.

12. An electronic device comprising:
a display module; and
a processor operatively coupled to the display module, and configured to:
control the display module to display a user interface (UI) of a first application program executed in the electronic device as a foreground program; and
in response to executing a second application program in the electronic device as the foreground program control the display module to display a UI of the second application program by switching the first application program to a background program hiding the UI of the first application program,
wherein the first application program switched to a background program is operated in one of a freeze state or an unfreeze state based on whether the first application program is included in a white list according to identification information of the first application program,
wherein the white list comprises a predetermined list of application programs which is set to be continuously executed in the unfreeze state, and wherein the freeze state comprise a sleep mode requiring resources for the first application program less than resources of the unfreeze state which is an active mode.

13. The electronic device of claim 12, wherein the processor is configured to determine that the first application program is continuously executed in the unfreeze state when the identification information of the first application program is included in the white list.

14. The electronic device of claim 12, wherein the predetermined list of application programs comprises a list of identification information of each of application programs corresponding to one or more of a cluster home, a menu screen, a system popup, and a notification panel.

15. The electronic device of claim 12, wherein the processor is configured to determine that the first application program is continuously executed in the unfreeze state when the identification information of the first application program corresponds to one or more of music or navigation and the first application program is in an activation state just before the first application program is switched to the background program.

16. The electronic device of claim 12, wherein the processor is configured to switch the first application program to the foreground program again, update data automatically to operate normally, and execute the first application program in the unfreeze state when a resume request for the first application program of the freeze state is received.

17. The electronic device of claim 12, wherein the processor is configured to switch the first application program to the foreground program again, update data automatically to operate normally, and execute the first application program in the unfreeze state when a back request for the first application program of the freeze state is received.

18. The electronic device of claim 12, wherein the processor is configured to switch the first application program to the foreground program again, update data automatically to operate normally, and execute the first application program in the unfreeze state when an event for the first application program of the freeze state is requested.

19. The electronic device of claim 12, wherein the processor is configured to switch a state of the first application program to the unfreeze state and terminate the first application program in a state where the first application program is the background program when a terminate request for the first application program of the freeze state is received.

20. A non-transitory computer-readable medium of an electronic device storing one or more programs comprising instructions to perform a method, the method comprising:
displaying a user interface (UI) of a first application program executed in the electronic device as a foreground program; and
in response to executing a second application program in the electronic device as the foreground program, displaying a UI of the second application program by switching the first application program to a background program hiding the UI of the first application program,
wherein the first application program switched to the background program is operated in one of a freeze state or an unfreeze state based on whether the first application program is included in a white list according to identification information of the first application program,
wherein the white list comprises a predetermined list of application programs which is set to be continuously executed in the unfreeze state, and wherein the freeze state comprises a sleep mode requiring resources for the first application program less than resources of the unfreeze state which is an active mode.

\* \* \* \* \*